United States Patent
Ito et al.

(10) Patent No.: US 10,277,817 B2
(45) Date of Patent: Apr. 30, 2019

(54) INFORMATION PROCESSING APPARATUS AND INFORMATION PROCESSING METHOD

(71) Applicant: SONY CORPORATION, Tokyo (JP)

(72) Inventors: Ryogo Ito, Tokyo (JP); Yoko Fukata, Tokyo (JP); Keiji Okamoto, Chiba (JP); Kazuma Akamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/323,499

(22) PCT Filed: May 29, 2015

(86) PCT No.: PCT/JP2015/065599
§ 371 (c)(1),
(2) Date: Jan. 3, 2017

(87) PCT Pub. No.: WO2016/013294
PCT Pub. Date: Jan. 28, 2016

(65) Prior Publication Data
US 2017/0150051 A1    May 25, 2017

(30) Foreign Application Priority Data
Jul. 23, 2014  (JP) ................................. 2014-149792

(51) Int. Cl.
*H04N 5/232*        (2006.01)
*H04N 5/225*        (2006.01)
(Continued)

(52) U.S. Cl.
CPC ......... *H04N 5/23245* (2013.01); *G03B 15/00* (2013.01); *G03B 17/48* (2013.01);
(Continued)

(58) Field of Classification Search
CPC .......... H04N 5/23245; H04N 5/23206; H04N 7/147; H04N 5/23203; H04N 5/23216; H04M 1/7253; G03B 17/48
See application file for complete search history.

(56) References Cited

U.S. PATENT DOCUMENTS 6,313,875 B1 *  11/2001  Suga .................... H04N 7/142
                                                348/14.08
2005/0249486 A1 *  11/2005  Murray .................. G03B 17/00
                                                396/56
(Continued)

FOREIGN PATENT DOCUMENTS

JP       10-164422 A      6/1998
JP       2003-101849 A    4/2003
(Continued)

OTHER PUBLICATIONS

Office Action for JP Patent Application No. 2016535825, dated Aug. 29, 2017, 8 pages of Office Action and 8 pages of English Translation.

(Continued)

*Primary Examiner* — Ahmed A Berhan
(74) *Attorney, Agent, or Firm* — Chip Law Group

(57) ABSTRACT

Provided is an information processing apparatus including: a determination unit configured to determine whether a mode in which an external apparatus is capable of detecting a state of an imaging unit is set according to a communication state through a wireless communication channel between the information processing apparatus and the external apparatus; and a controller configured to control an operation of the imaging unit based on a result of the determination.

13 Claims, 12 Drawing Sheets

(51) Int. Cl.
  *G03B 17/48* (2006.01)
  *H04M 1/725* (2006.01)
  *G03B 15/00* (2006.01)

(52) U.S. Cl.
  CPC ........ *H04M 1/7253* (2013.01); *H04N 5/2252* (2013.01); *H04N 5/23206* (2013.01); *H04N 5/23216* (2013.01); *H04N 5/23293* (2013.01); *G03B 2206/00* (2013.01); *H04M 2250/52* (2013.01)

(56) References Cited

U.S. PATENT DOCUMENTS

| | | | | |
|---|---|---|---|---|
| 2007/0013801 | A1* | 1/2007 | Sezan | H04N 1/00291 348/333.01 |
| 2008/0240697 | A1* | 10/2008 | Marcus | G03B 17/38 396/58 |
| 2014/0049636 | A1 | 2/2014 | O'Donnell et al. | |

FOREIGN PATENT DOCUMENTS

| | | |
|---|---|---|
| JP | 2004-173036 A | 6/2004 |
| JP | 2007-173910 A | 7/2007 |
| JP | 2008-141704 A | 6/2008 |
| JP | 2009-273033 A | 11/2009 |
| WO | 03/028366 A1 | 4/2003 |

OTHER PUBLICATIONS

Sowa Kaneto, "Tactics, 12th, Wearable Camera GoProxHDR-AS15", Picture Industry Publishing Co. Ltd., vol. 29, No. 1, Jan. 1, 2013, pp. 76-79.

"Handbook, Digital HD Video Camera Recorder HDR-AS15", Sony Corporation, 4-432-600-02(1), 2012, pp. 10-12, 18- 28, 40-42, 60-61.

Kota Nakamura, "Wearable HD Video Camera, Sony "Action Cam" HDR-AS15", Picture Industry Publishing Co. Ltd., vol. 28, No. 11, Nov. 1, 2012, pp. 76-79.

Sowa Kaneto, "Panasonic Wearable Camera HX-A100", Picture Industry Publishing Co. Ltd., vol. 29, No. 5, May 1, 2013, pp. 76-79.

\* cited by examiner

FIG. 9
CURRENT IMAGING
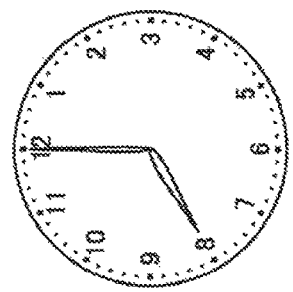
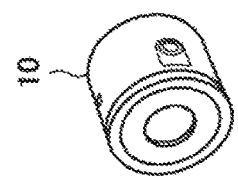
PREVIOUS IMAGING
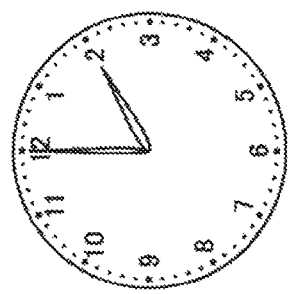
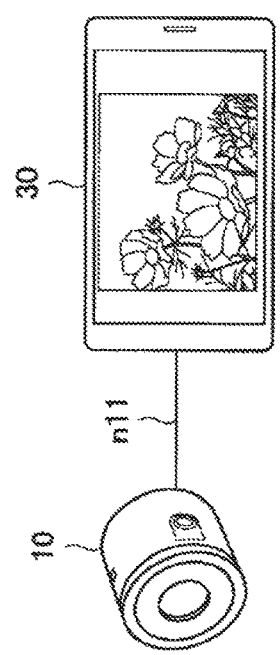

FIG. 10
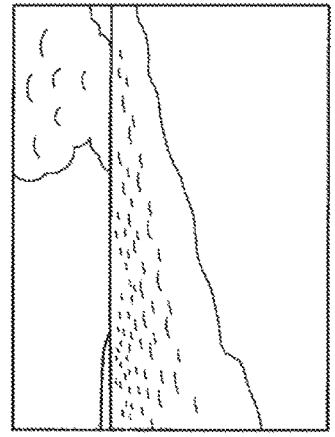
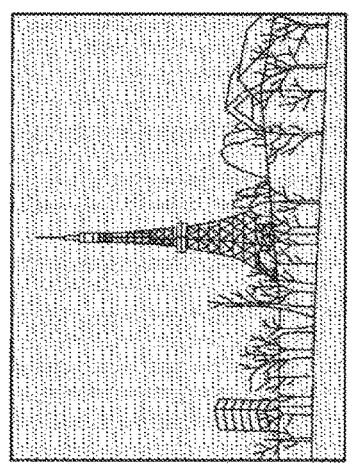
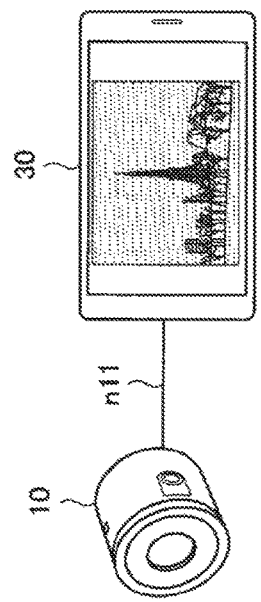

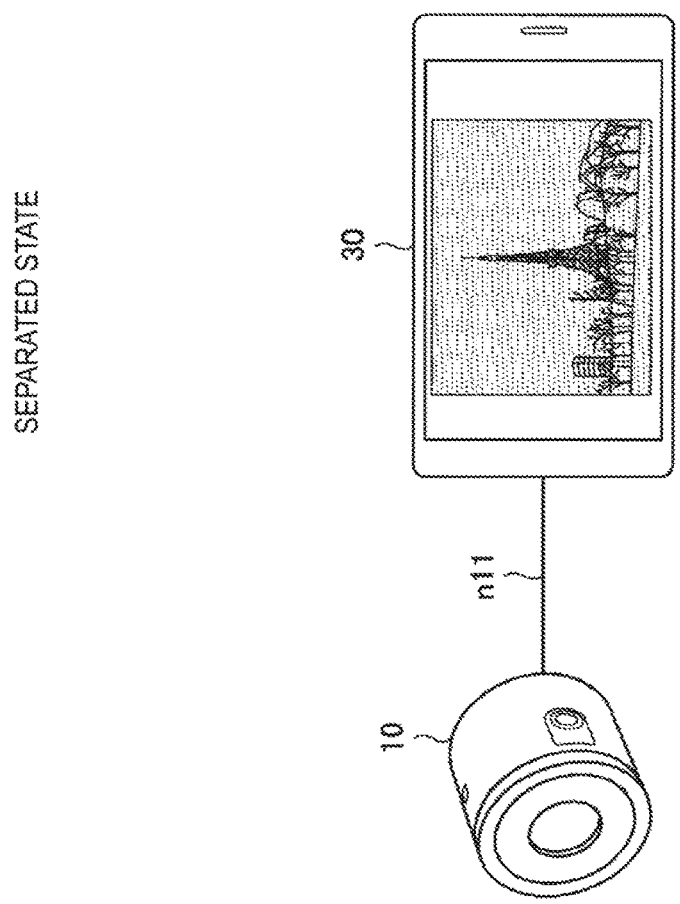
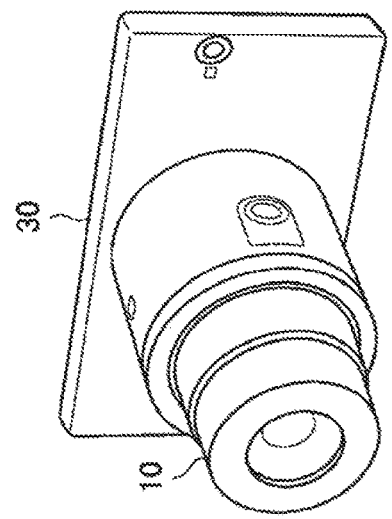
FIG. 12

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/065599 filed on May 29, 2015, which claims priority benefit of Japanese Patent Application No. JP 2014-149792 filed in the Japan Patent Office on Jul. 23, 2014. Each of the above-referenced applications is hereby incorporated herein by reference in its entirety.

TECHNICAL FIELD

The present disclosure relates to an information processing apparatus, an information processing method, and a program.

BACKGROUND ART

Some devices including digital still cameras or digital video cameras (sometimes referred to collectively as "digital cameras" hereinafter) can be connected to an information processing terminal such as a smartphone via a wireless network. Thus, examples of communication standards allowing different types of devices to be connected to each other via a wireless network include wireless fidelity (Wi-Fi, registered trademark).

In recent years, there has been provided a function allowing an image capturing apparatus such as a digital camera to be operated through an information processing terminal by connecting the information processing terminal and the image capturing apparatus to each other via a network. As such a function has been provided, as such an image capturing apparatus, an image capturing apparatus in which an input-output interface provided in the image capturing apparatus is limited (for example, simplified or eliminated) has been provided on the assumption that an information processing terminal connected to the image capturing apparatus via a network is used as a main user interface (UI).

CITATION LIST

Patent Literature

Patent Literature 1: JP 2007-173910A
Patent Literature 2: JP 2004-173036A
Patent Literature 3: JP 2008-141704A
Patent Literature 4: JP-H10-164422A

DISCLOSURE OF INVENTION

Technical Problem

As the above-described image capturing apparatus in which the input-output interface is limited, there is an image capturing apparatus that is capable of capturing an image through an operation via an input interface provided in the image capturing apparatus even in a state in which the image capturing apparatus is operated as a single body (in other words, a state in which the image capturing apparatus is not associated with an information processing terminal).

On the other hand, in a state in which the image capturing apparatus is operated as a single body, since an output interface is limited, there may be cases in which a user cannot check settings in imaging such as exposure, white balance, or an angle of view, and also, a desired image (for example, an image in which a photographic subject is successively reproduced) cannot be captured.

The present disclosure provides an image processing apparatus, an image processing method, and a program capable of capturing a desired image even in a situation in which an output interface is limited.

Solution to Problem

According to the present disclosure, there is provided an information processing apparatus including: a determination unit configured to determine whether a mode in which an external apparatus is capable of detecting a state of an imaging unit is set according to a communication state through a wireless communication channel between the information processing apparatus and the external apparatus; and a controller configured to control an operation of the imaging unit based on a result of the determination.

According to the present disclosure, there is provided an information processing method including: determining whether a mode in which an external apparatus is capable of detecting a state of an imaging unit is set according to a communication state through a wireless communication channel between the information processing apparatus and the external apparatus; and controlling, by a processor, an operation of the imaging unit based on a result of the determination.

According to the present disclosure, there is provided a program that causes a computer to execute: determining whether a mode in which an external apparatus is capable of detecting a state of an imaging unit is set according to a communication state through a wireless communication channel between the information processing apparatus and the external apparatus; and controlling an operation of the imaging unit based on a result of the determination.

Advantageous Effects of Invention

According to the present disclosure described above, an image processing apparatus, an image processing method, and a program capable of capturing a desired image even in a situation in which an output interface is limited can be provided.

Note that the effects described above are not necessarily limitative. In addition to or in place of the above effects, there may be achieved any one of the effects described in this specification or other effects that may be grasped from this specification.

BRIEF DESCRIPTION OF DRAWINGS

FIG. 9 is a diagram illustrating an example of a control method according to Modification Example 1-1.

FIG. 10 is a diagram illustrating an example of a control method according to Modification Example 1-2.

FIG. 12 is a diagram illustrating an overview of an information processing system according to Modification Example 2.

MODE(S) FOR CARRYING OUT THE INVENTION

Figure 1:
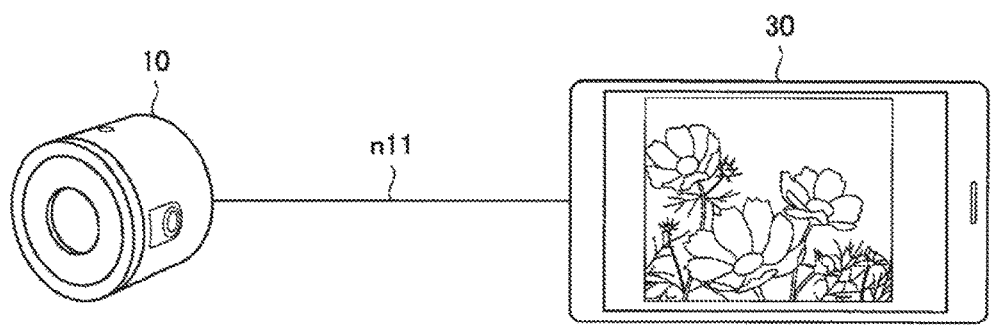
FIG. 1 is a diagram illustrating an exemplary system configuration of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. Overview
2. Functional configuration
3. Process
4. Modification Example 1: Example of control according to change in environment in which image is captured
   4.1. Modification Example 1-1: Control based on time information in imaging
   4.2. Modification Example 1-2: Control based on change in imaging scene
   4.3. Modification Example 1-3: Control based on position information in imaging
   4.4. Conclusion
5. Modification Example 2: Example of operation when image capturing apparatus is associated with information processing terminal
6. Hardware configuration
7. Conclusion

1. OVERVIEW

First, an example of a general system configuration of an information processing system according to an embodiment of the present disclosure will be described with reference to FIG. 1. FIG. 1 is a diagram illustrating an exemplary system configuration of the information processing system according to the present embodiment.

As illustrated in FIG. 1, the information processing system according to the present embodiment is configured to include an image capturing apparatus 10 and an information processing terminal 30. The image capturing apparatus 10 corresponds to a device for capturing an image including a still image and a moving image, such as a so-called digital camera. The information processing terminal 30 corresponds to a user terminal, such as a so-called smartphone.

The image capturing apparatus 10 and the information processing terminal 30 may be connected to each other to be capable of communicating with each other through a communication channel such as a wireless network n11. A specific example of the network n11 may include a Wi-Fi (registered trademark)-based network. For example, when the network n11 based on the Wi-Fi (registered trademark) standard is applied, any one of the image capturing apparatus 10 and the information processing terminal 30 is operated as an access point, and the other is connected to the one as a station.

In particular, the information processing terminal 30 according to the present embodiment is configured to be capable of controlling an operation of the image capturing apparatus 10 (e.g., an operation for capturing an image) that is connected to the information processing terminal 30 via the network n11. In other words, the image capturing apparatus 10 is capable of capturing an image such as a moving image and a still image based on an instruction transmitted from the information processing terminal 30 via the network n11. This function may be realized by installing an application, which is created by using, as one example, an application programming interface (API) used to control the operation of the image capturing apparatus 10 via a network, in the information processing terminal 30. An application used to implement the function described above may be incorporated into the information processing terminal 30 in advance.

Although the following description will be given by taking a case where the information processing terminal 30 is a smartphone as an example, the information processing terminal 30 is not necessarily limited to a smartphone. As a specific example, a device that is connectable to the image capturing apparatus 10 via a wireless network, such as a remote controller, may be applied to serve as the information processing terminal 30.

Figure 2:
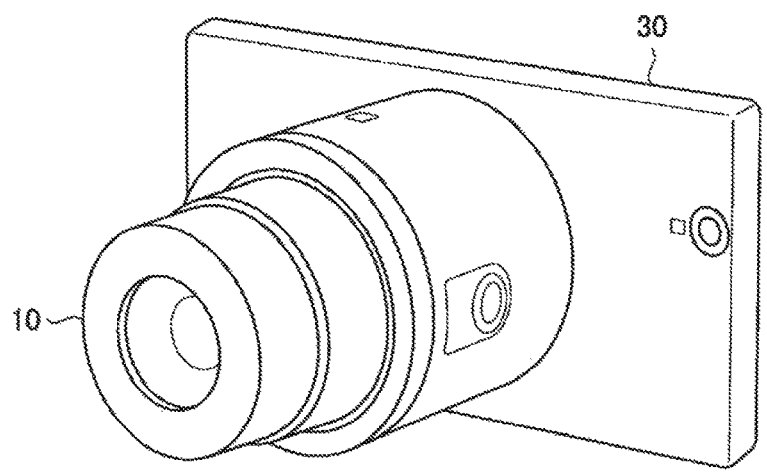
FIG. 2 shows an example of an image capturing apparatus in which an input-output interface is limited.

Such a configuration makes it possible to use a device having a limited (e.g., simplified or eliminated) input-output interface as the image capturing apparatus 10. As one example, FIG. 2 illustrates an example of the image capturing apparatus 10 having a limited (e.g., simplified or eliminated) input-output interface. In the example illustrated in FIG. 2, in the image capturing apparatus 10, an output interface such as a liquid crystal display is eliminated and an operation interface is limited as well, on the assumption that the information processing terminal 30 is used as an interface used to perform an operation for capturing an image. More specifically, in the example illustrated in FIG. 2, the operation interface of the image capturing apparatus 10 is limited to a simplified operation interface such as a button (e.g., a shutter button), provided in at least one position in a casing of the image capturing apparatus 10 (for example, a side surface of the casing). In this description, the "casing of the image capturing apparatus 10" corresponds to a main body of the image capturing apparatus 10 in which various devices (for example, an image capturing device, an operation interface, or the like) of the image capturing apparatus 10 are provided, and more specifically, corresponds to an external apparatus including a frame of the image capturing apparatus 10.

The image capturing apparatus 10 may be removably attached to the information processing terminal 30 as illustrated in FIG. 2. As a specific example, the image capturing apparatus 10 may be configured to be attached to the information processing terminal 30 by providing an attachment, which is used to fix (or hold) the image capturing apparatus 10 to the information processing terminal 30, to the information processing terminal 30 or the image capturing apparatus 10.

The image capturing apparatus 10 illustrated in FIG. 2 is merely an example, and is not necessarily intended to limit the configuration of the image capturing apparatus 10 according to the present embodiment. In other words, a typical image capturing apparatus that is provided with an input-output interface such as a liquid crystal display may be used as the image capturing apparatus 10 as long as it is capable of communicating with the information processing terminal 30 via the network n11.

Figure 3:
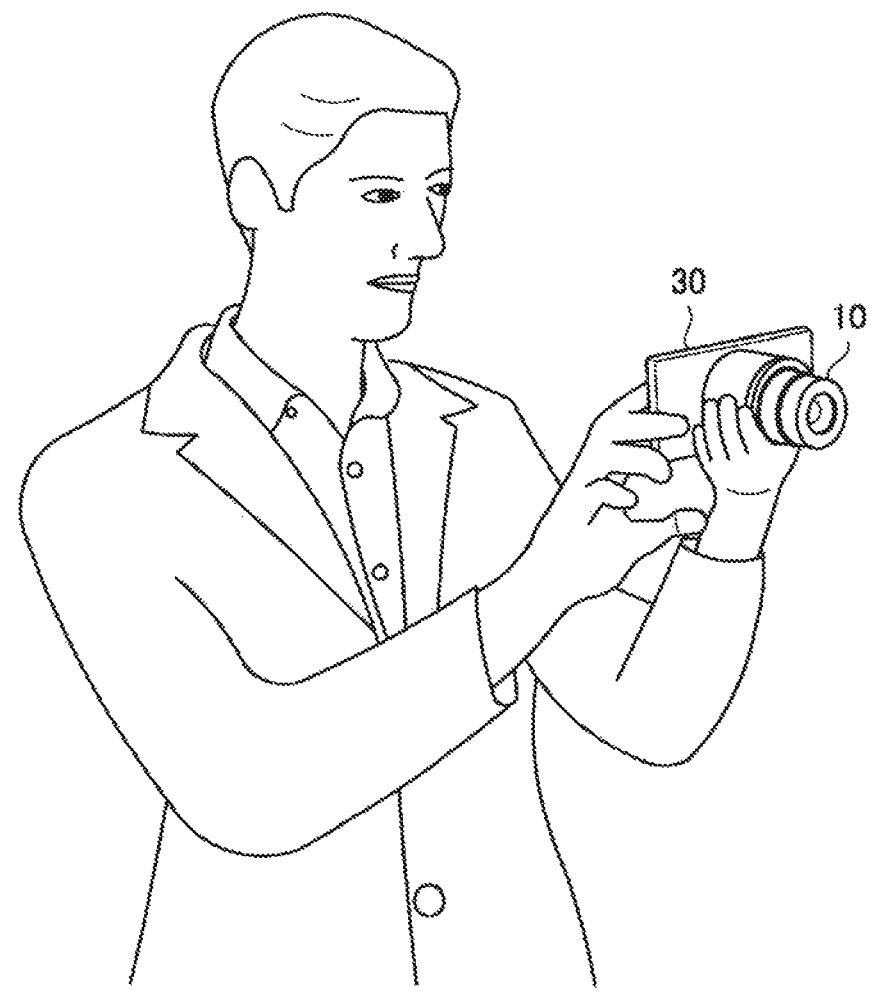
FIG. 3 is a diagram illustrating an exemplary usage form of the information processing system according to the present embodiment.

For example, FIG. 3 is a diagram illustrating an exemplary usage form of the information processing system according to the present embodiment, which shows an example of a case in which the image capturing apparatus 10 and the information processing terminal 30 are connected to each other via a network to be operated in association. As illustrated in FIG. 3, by attaching the image capturing apparatus 10 to the information processing terminal 30, a user can use the image capturing apparatus 10 in a similar way to a so-called digital camera in which an input-output interface is not limited.

Figure 4:
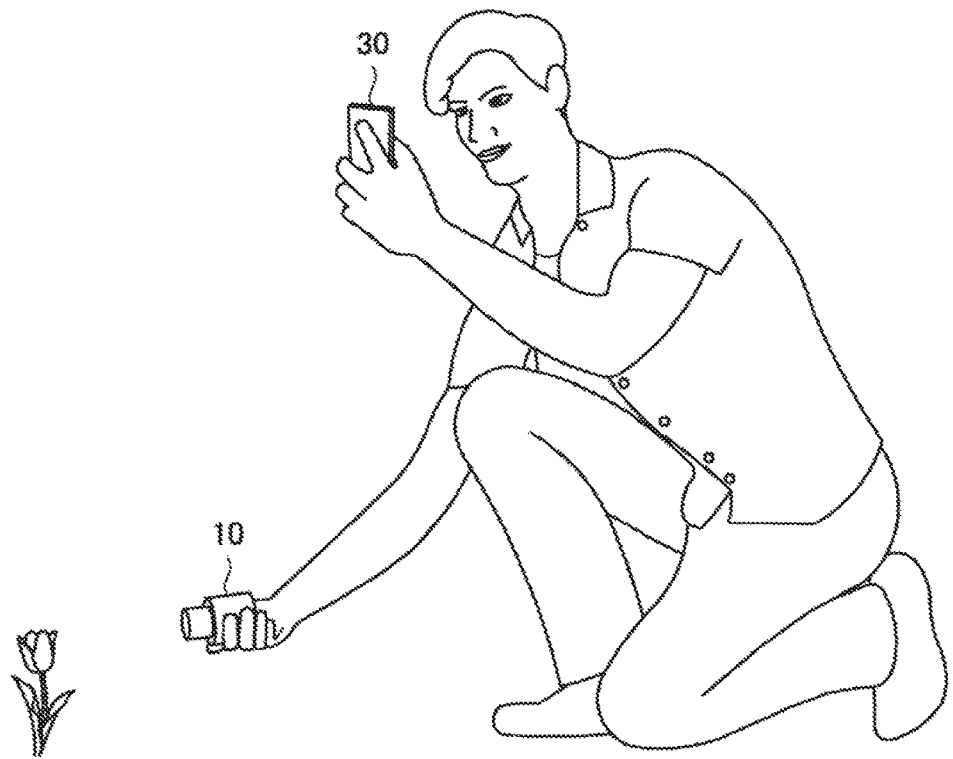
FIG. 4 is a diagram illustrating another exemplary usage form of the information processing system according to the present embodiment.

Further, FIG. 4 is a diagram illustrating another exemplary usage form of the information processing system according to the present embodiment, which shows another example of a case in which the image capturing apparatus 10 and the information processing terminal 30 are connected to each other via a network to be operated in association. The example illustrated in FIG. 4 is an example in which the image capturing apparatus 10 and the information processing terminal 30 which are connected to each other via the network are used in a state in which the image capturing apparatus 10 and the information processing terminal 30 are separated from each other (in other words, in a state in which the image capturing apparatus 10 is not attached to the information processing terminal 30). As illustrated in FIG. 4, the information processing system according to the present embodiment allows the image capturing apparatus 10 and the information processing terminal 30 which are operated in association to be capable of being operated without a limit in physical positions.

Figure 5:
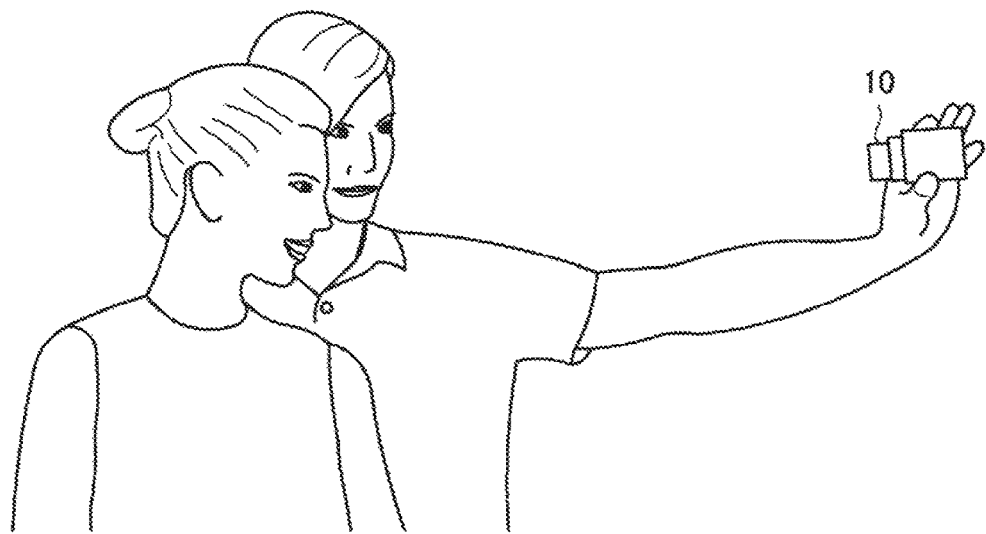
FIG. 5 is a diagram illustrating another exemplary usage form of the information processing system according to the present embodiment.
Figure 6:
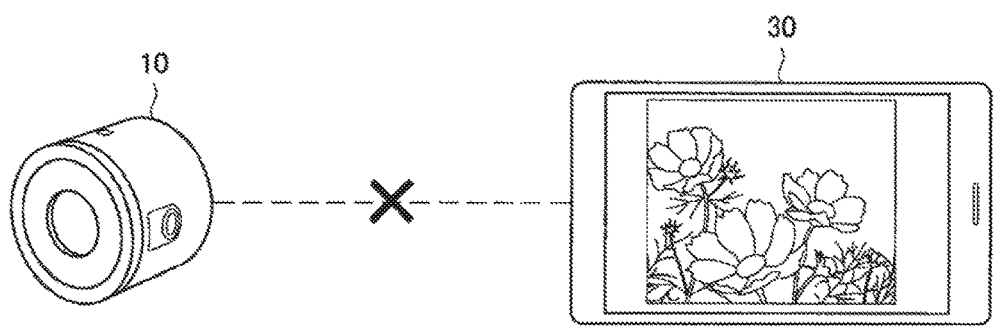
FIG. 6 is a diagram illustrating another exemplary usage form of the information processing system according to the present embodiment.

Further, FIGS. 5 and 6 are diagrams illustrating other exemplary usage forms of the information processing system according to the present embodiment, which show examples of a case in which the image capturing apparatus 10 is operated as a single body. As illustrated in FIG. 5, the image capturing apparatus 10 according to the present embodiment is configured to be capable of capturing an image even when the image capturing apparatus 10 is not associated with the information processing terminal 30, in other words, even when the image capturing apparatus 10 is operated as a single body. In this case, for example, a user operates the image capturing apparatus 10 via an input interface (e.g., a button or a switch) provided in the image capturing apparatus 10. In other words, when the image capturing apparatus 10 is operated as a single body, the image capturing apparatus 10 is operated based on only an instruction given via the input interface among the input interface provided in the image capturing apparatus 10 and the information processing terminal 30 which is an external apparatus.

On the other hand, as illustrated in FIG. 6, when the image capturing apparatus 10 is operated as a single body, communication between the image capturing apparatus 10 and the information processing terminal 30 is not established. Thus, it is difficult for the information processing terminal 30 to detect a state of the image capturing apparatus 10 and to present the state to the user. In addition, a case in which the image capturing apparatus 10 is operated as a single body may correspond to a case in which the user operates only the image capturing apparatus 10 without operating (using) the information processing terminal 30.

Namely, when the image capturing apparatus 10 is operated as a single body, the user checks a variety of information via the output interface (in other words, the limited output interface) provided in the image capturing apparatus 10, for example. Accordingly, when the image capturing apparatus 10 is operated as a single body, the type or volume of information capable of being presented to the user by the image capturing apparatus 10 is limited compared with the case in which the image capturing apparatus 10 and the information processing terminal 30 are operated in association.

In such a situation, when the image capturing apparatus 10 is operated as a single body, it is difficult for the user to set settings for capturing an image such as exposure, white balance, ISO sensitivity, or the like, or an angle of view in imaging. Thus, for example, in a situation in which white balance of the image capturing apparatus 10 is set according to indoor imaging at night when a large number of incandescent lamps are used without consideration of outdoor imaging in the daytime, there are cases in which it is difficult for the user to check the settings. In addition, since it is difficult to check a through-the-lens image, even when the angle of view is inclined, there are cases in which it is difficult for the user to recognize that the angle of view is inclined.

As described above, when the image capturing apparatus 10 in which the output interface is limited is operated as a single body, there are cases in which it is difficult to capture an image intended by the user.

Thus, in the information processing system according to the present embodiment, in a state in which the image capturing apparatus 10 is operated as a single body, the image capturing apparatus 10 is operated in an operation mode for automatically setting a setting related to an imaging condition such as exposure or white balance or automatically correcting an angle of view (performing horizontal correction using image processing). In other words, in the information processing system according to the present embodiment, when the image capturing apparatus 10 detects a state in which the image capturing apparatus 10 is operated as a single body, the image capturing apparatus 10 transitions to an operation mode which is set in advance. With such a configuration, according to the information processing system according to the present embodiment, even in a situation in which it is difficult to set settings in imaging or to check an angle of view, it is possible to prevent an image which is not intended by a user, such as an image captured in a state in which settings suitable for a photographic subject or a scene are not set, from being captured. Thus, hereinafter, the information processing system according to the present embodiment will be described in more detail.

2. FUNCTIONAL CONFIGURATION

Figure 7:
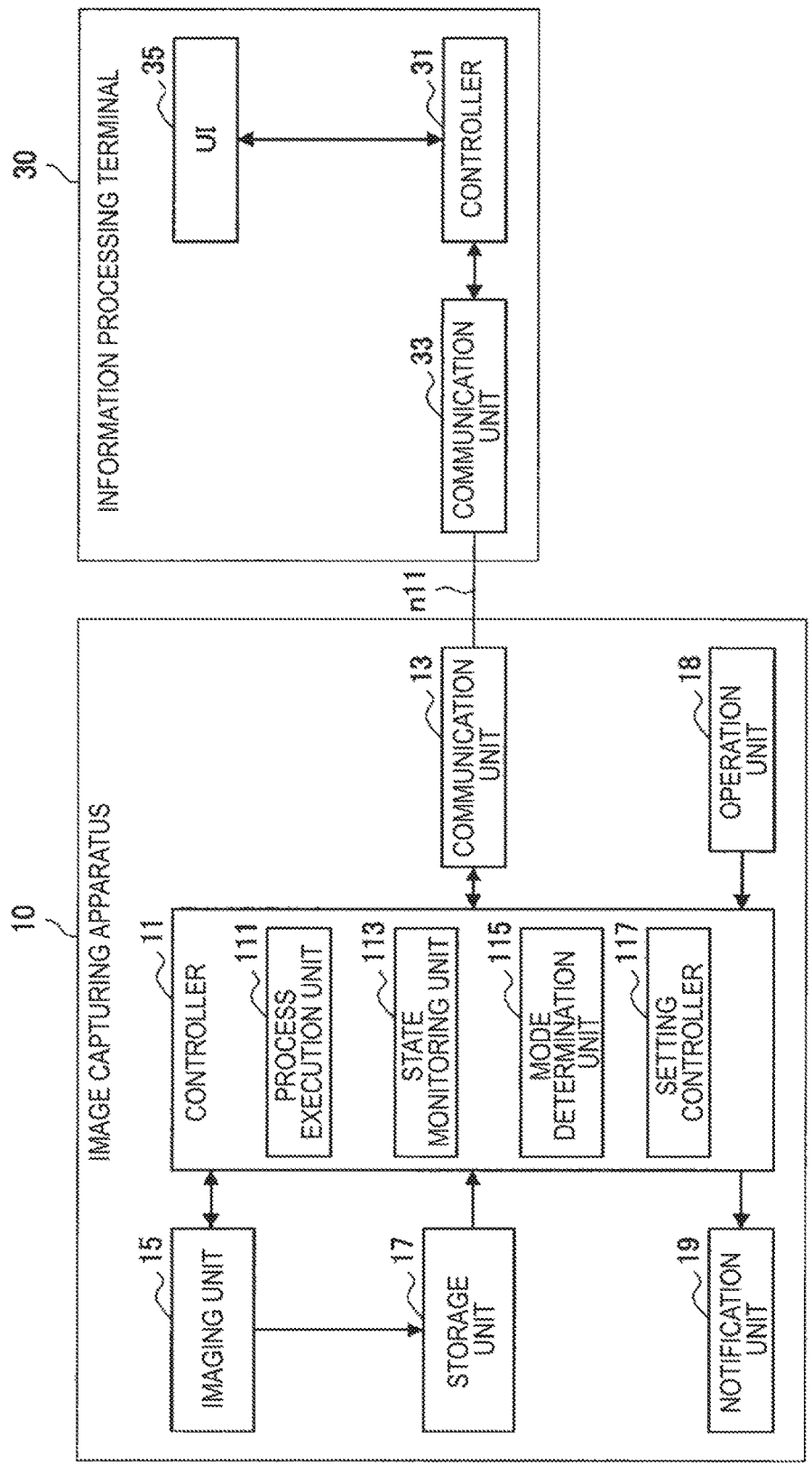
FIG. 7 is a block diagram illustrating an exemplary functional configuration of the information processing system according to the present embodiment.

First, an example of a functional configuration of the information processing system according to the present embodiment will be described with reference to FIG. 7. FIG. 7 is a block diagram illustrating an example of a functional configuration of the information processing system according to the present embodiment.

As illustrated in FIG. 7, the image capturing apparatus 10 includes a controller 11, a communication unit 13, an imaging unit 15, a storage unit 17, an operation unit 18, and a notification unit 19. Further, the controller 11 includes a process execution unit 111, a state monitoring unit 113, a mode determination unit 115, and a setting controller 117. Further, the information processing terminal 30 includes a controller 31, a communication unit 33, and a UI 35.

The communication unit 33 is a communication interface that allows each component in the information processing terminal 30 to communicate with the image capturing apparatus 10 via the wireless network n11. A specific example of the network n11 includes a Wi-Fi (registered trademark)-based network, as described above.

Hereinafter, in a case where each component in the information processing terminal 30 performs data transmission and reception with the image capturing apparatus 10 via the network n11, the data transmission and reception is assumed to be performed through the communication unit 33 unless otherwise described.

The UI 35 is a user interface that allows a user to operate the information processing terminal 30. For example, the UI 35 may include an operation unit that allows a user to operate the information processing terminal 30, such as a button or a touch panel, and a display unit that allows the information processing terminal 30 to present information to the user, such as a display unit.

The controller 31 is configured to be capable of controlling an operation of the image capturing apparatus 10 connected via the network n11. As a specific example, the controller 31 executes an application generated based on an API for operating the image capturing apparatus 10 via the network to control the operation of the image capturing apparatus 10.

As a specific example, the controller 31 may instruct the image capturing apparatus 10 to capture an image via the network n11 based on an instruction given through the UI 35 from a user. In this case, the controller 31 may acquire the captured image from the image capturing apparatus 10 via the network n11 as a response to the instruction. Further, the controller 31 may present the image captured by the image capturing apparatus 10 to the user through the UI 35 (for example, a display unit).

The controller 31 may instruct the image capturing apparatus 10 to output a through-the-lens image via the network n11 based on an instruction given through the UI 35 from a user. In this case, the controller 31 sequentially acquires captured through-the-lens images from the image capturing apparatus 10 via the network n11 as a response to the instruction. The controller 31 may sequentially present the acquired through-the-lens images to the user through the UI 35.

Further, the controller 31 may make reference to or update a variety of information held in the image capturing apparatus 10 via the network n11. As a specific example, the controller 31 may acquire information indicating various settings such as imaging conditions, held in the image capturing apparatus 10 from the image capturing apparatus 10 via the network n11, and may present the acquired information to a user through the UI 35. Further, the controller 31 may instruct the image capturing apparatus 10 to update the information indicating the various settings held in the image capturing apparatus 10 via the network n11, based on an instruction given through the UI 35 from the user.

The communication unit 13 is a communication interface that allows each component in the image capturing apparatus 10 to communicate with the information processing terminal 30 via the wireless network n11. A specific example of the network n11 includes a Wi-Fi (registered trademark)-based network as described above.

Hereinafter, in a case where each component in the image capturing apparatus 10 performs data transmission and reception with the information processing terminal 30 via the network n11, the data transmission and reception is assumed to be performed through the communication unit 13 unless otherwise described.

The imaging unit 15 is provided with an image sensor, and captures an image such as a still image or a moving image of a photographic subject, based on an instruction, which will be described later, from the controller 11. This image sensor is an image pickup device that captures an image of a photographic subject to obtain digital data of the captured image, such as a complementary metal-oxide-semiconductor (CMOS) image sensor and a charge-coupled device (CCD) image sensor. The imaging unit 15 may record the captured image in the storage unit 17. The imaging unit 15 may directly output the captured image to the controller 11.

The imaging unit 15 may capture an image based on capturing conditions instructed from the controller 11. A specific example of the capturing conditions includes an exposure condition based on an aperture and a shutter speed, a magnification ratio of optical zooming, digital zooming or the like, ISO sensitivity, white balance, and the like.

The imaging unit 15 may capture a so-called through-the-lens image (e.g., pixel-thinned image) and sequentially output the captured through-the-lens images to the controller 11, based on an instruction from the controller 11.

The storage unit 17 is a recording medium that is used to record the captured image. The storage unit 17 may be configured as a recording medium that is incorporated in the image capturing apparatus 10. The storage unit 17 may be configured as an external recording medium that is removably attached the image capturing apparatus 10.

Although the exemplary configuration of the image capturing apparatus 10 including the imaging unit 15 therein is illustrated in the example of FIG. 7, the imaging unit 15 may be provided on the outside of the image capturing apparatus 10. Similarly, although the exemplary configuration of the image capturing apparatus 10 including the storage unit 17 therein is illustrated in the example of FIG. 7, the storage unit 17 may be provided on the outside of the image capturing apparatus 10.

The operation unit 18 is configured to allow a user to operate the image capturing apparatus 10. A specific configuration of the operation unit 18 includes an input device such as a button or a switch. The operation unit 18 is provided in at least one position of the casing of the image capturing apparatus 10. The operation unit 18 provided in the image capturing apparatus 10 having the imaging unit 15 corresponds to an example of an operation unit provided in the same casing as the casing in which the imaging unit is provided.

The notification unit 19 is configured to allow the image capturing apparatus 10 to notify a user of information. The notification unit 19 is provided in at least one position in the casing of the image capturing apparatus 10. The notification unit 19 may be configured of a display device such as a display, for example. In this case, the notification unit 19 may display notification information of which a user is to be notified as display information, to thereby notify the user of the notification information.

Further, as another example, the notification unit 19 may be a device that notifies a user of predetermined information using a pattern of lighting or blinking, such as a light emitting diode (LED). The notification unit 19 may be a device that outputs a predetermined sound (or voice) to notify the user of predetermined information, such as a speaker. In this way, as long as it is capable of notifying a user of information, the type of the notification unit 19 is not particularly limited. The notification unit 19 corresponds to an example of a notification unit provided in the same casing as the casing in which the imaging unit is provided (in other words, a notification unit provided in the casing of the image capturing apparatus 10 having the imaging unit 15).

The process execution unit 111 receives an instruction from the information processing terminal 30 via the network n11, and executes a function corresponding to the instruction, to thereby control an operation of the imaging unit 15.

For example, the process execution unit 111 may instruct the imaging unit 15 to capture an image or acquire a through-the-lens image, based on an instruction acquired from the operation unit 18 or the information processing terminal 30.

As a specific example, when receiving an image capturing instruction from the information processing terminal 30 via the network n11, the process execution unit 111 causes the imaging unit 15 to capture an image based on the instruction. At this time, the process execution unit 111 may acquire the captured image from the imaging unit 15 and may output the acquired image to the information processing terminal 30 via the network n11. The process execution unit 111 may acquire the captured image directly from the imaging unit 15, or may read the image recorded in the storage unit 17. After receiving the output of the image from the process execution unit 111, the information processing terminal 30 is capable of presenting the information acquired by the imaging unit 15 to a user through the UI 35 (e.g., display unit). Further, with such a configuration, even in the case of a configuration in which a display unit such as a so-called display is not provided, the image capturing apparatus 10 is capable of presenting the captured image to the user through the UI 35 of the information processing terminal 30.

The process execution unit 111, when receiving a through-the-lens image output instruction from the information processing terminal 30 via the network n11, causes the imaging unit 15 to capture a through-the-lens image based on the instruction. Then, the process execution unit 111 sequentially acquires the captured through-the-lens images from the imaging unit 15 and outputs the acquired through-the-lens images to the information processing terminals 30 via the network n11.

The process execution unit 111 receives an instruction from the operation unit 18 to execute a function corresponding to the instruction, to thereby control an operation of the imaging unit 15.

As a specific example, upon receiving an image capturing instruction from the operation unit 18, the process execution unit 111 causes the imaging unit 15 to capture an image based on the instruction. In this case, the image captured by the imaging unit 15 is stored in the storage unit 17, for example.

A setting for controlling the operation of the imaging unit 15 by the process execution unit 111 is controlled by the setting controller 117 which will be described later. A specific example of the setting includes a setting for controlling imaging conditions for capturing an image by the imaging unit 15, such as an exposure condition based on an aperture and a shutter speed, a magnification ratio of optical zooming, digital zooming or the like, ISO sensitivity, white balance, and the like.

The process execution unit 111 may perform predetermined image processing with respect to the captured image. As a specific example, the process execution unit 111 may perform image processing so that an angle of view of the captured image becomes horizontal, to thereby correct the image. The presence or absence of application of the image processing with respect to the captured image or a setting of the type of image processing to be applied or the like is controlled by the setting controller 117, which will be described later, similar to the above-described imaging conditions.

The state monitoring unit 113 monitors whether communication between the image capturing apparatus 10 and the information processing terminal 30 via the network n11 is in a valid state, and notifies the mode determination unit 115 of the monitoring result. The monitoring of whether the communication between the image capturing apparatus 10 and the information processing terminal 30 via the network n11 is in the valid state in the state monitoring unit 113 corresponds to monitoring of whether Wi-Fi connection between the image capturing apparatus 10 and the information processing terminal 30 is established, for example. Further, the monitoring may be monitoring of whether an application installed in the information processing terminal 30 is in a state in which it is capable of controlling the image capturing apparatus 10 using an API. For example, the state monitoring unit 113 monitors whether the application installed in the information processing terminal 30 and the image capturing apparatus 10 are in a state in which it is capable of performing communication therebetween using the API. Since there may be cases in which Wi-Fi connection between the image capturing apparatus 10 and the information processing terminal 30 is established but an application for controlling the image capturing apparatus 10 is not installed in the information processing terminal 30 or cases in which the application is installed but is not operated, the state monitoring unit 113 monitors whether the image capturing apparatus 10 is in a state in which it is controllable by the application installed in the information processing terminal 30, to thereby perform appropriate state determination. Here, the state monitoring unit 113 may sequentially monitor (alive monitoring) communication via the network n11, may detect communication cut-off when the communication via the network n11 is cut off, and may notify the mode determination 115 of the result. When communication via the network n11 is established, the state monitoring unit 113 may notify the mode determination unit 115 of the result.

The mode determination unit 115 determines a current operation mode of the image capturing apparatus 10 according to whether information transmission and reception is capable of being performed between the image capturing apparatus 10 and the information processing terminal 30 via the network n11 (in other words, whether the information processing terminal 30 is capable of detecting the state of the image capturing apparatus 10), based on the monitoring result notified of by the state monitoring unit 113. A specific example of the operation mode includes a mode in which the image capturing apparatus 10 and the information processing terminal 30 are capable of being operated in association or a mode in which the image capturing apparatus 10 is operated as a single body.

For example, the mode determination unit 115 recognizes that the network n11 between the image capturing apparatus 10 and the information processing terminal 30 is established based on the monitoring result notified of by the state monitoring unit 113. In this case, the mode determination unit 115 recognizes that an operation mode at a current point of time is the mode in which the image capturing apparatus 10 and the information processing terminal 30 are capable of being operated in association. The mode in which the image capturing apparatus 10 and the information processing terminal 30 are capable of being operated in association corresponds to a mode in which the information processing apparatus 30 which is an external apparatus of the image capturing apparatus 10 is capable of detecting a state of the imaging unit 15, in other words, an example of a "first mode." Specifically, the first mode may correspond to at least a mode in which communication such as Wi-Fi connection is established between the image capturing apparatus 10 and the information processing terminal 30, and the information processing apparatus 30 is capable of acquiring information held in the image capturing apparatus 10 from the image capturing apparatus 10. More specifically, the first mode may correspond to a mode in which the application installed in the information processing terminal 30 is capable of acquiring various setting values of the image capturing apparatus 10 using the API through the communication. Further, the first mode may be a mode in which the application installed in the information processing terminal 30 is capable of acquiring an image (e.g., an image displayed as a live view) captured by the imaging unit 15 from the image capturing apparatus 10 using the API through the communication. In addition, the first mode may be a mode in which the information processing terminal 30 is capable of controlling an operation of the image capturing apparatus 10 through the communication established between the image capturing apparatus 10 and the information processing terminal 30. Specifically, the first mode may correspond to a mode in which the application installed in the information processing terminal 30 causes the image capturing apparatus 10 to capture an image using the API through the communication. Furthermore, the first mode may be a mode in which the application installed in the information processing terminal 30 is capable of updating the various setting values of the image capturing apparatus 10 using the API through the communication.

Further, the mode determination unit 115 recognizes that the network n11 between the image capturing apparatus 10 and the information processing terminal 30 is cut off based on the monitoring result notified of by the state monitoring unit 113. In this case, the mode determination unit 115 recognizes that an operation mode at a current point of time is a mode in which the image capturing apparatus 10 is operated as a single body. The mode in which the image capturing apparatus 10 is operated as a single body corresponds to an example of a "second mode."

Here, when a state in which the network n11 between the image capturing apparatus 10 and the information processing terminal 30 is cut off continues for a predetermined period of time or longer, the mode determination unit 115 may recognize that the operation mode of the image capturing apparatus 10 transitions to the mode in which the image capturing apparatus 10 is operated as a single body. Using the control, when the network n11 is temporarily cut off, for example, in a situation in which communication quality of the network n11 between the image capturing apparatus 10 and the information processing terminal 30 deteriorates, it is possible to prevent the operation mode from transitioning.

The mode determination unit 115 notifies the setting controller 117 of the operation mode recognized based on the monitoring result notified of by the state monitoring unit 113.

The setting controller 117 changes the setting for controlling the operation of the imaging unit 15 by the above-described process execution unit 111 according to the operation mode of the image capturing apparatus 10 notified of by the mode determination unit 115.

As a specific example, when the operation mode of the image capturing apparatus 10 is the mode in which the image capturing apparatus 10 and the information processing terminal 30 are capable of being operated in association, the setting controller 117 controls various settings so that a setting based on an instruction given through the information processing terminal 30 from a user is reflected.

On the other hand, when the operation mode of the image capturing apparatus 10 is the mode in which the image capturing apparatus 10 is operated as a single body, the setting controller 117 changes various settings so that an imaging condition such as exposure or white balance is automatically controlled or the angle of view is automatically corrected, for example.

Here, the setting controller 117 may not necessarily change all the settings. As a specific example, the setting controller 117 may automatically set only the imaging condition such as exposure or white balance, and may not set automatic correction of the angle of view. Further, in the case of the mode in which the image capturing apparatus 10 is operated as a single body, the type of setting controlled by the setting controller 117 or its setting value may be changed based on a user's designation beforehand.

As another example, in the case of the mode in which the image capturing apparatus 10 is operated as a single body, the setting controller 117 may change the settings so that focusing of the imaging unit 15 is automatically performed in so-called autofocus (AF).

Further, as another example, in the case of the mode in which the image capturing apparatus 10 is operated as a single body, the setting controller 117 may set a correction amount due to image stabilization to be larger than that in the mode in which the image capturing apparatus 10 and the information processing terminal 30 are capable of being operated in association.

Furthermore, as another example, in the case of the mode in which the image capturing apparatus 10 is operated as a single body, the setting controller 117 may change the settings so that a so-called auto-shutter function becomes valid. Here, the auto-shutter function is a function for allowing the image capturing apparatus 10 to automatically release a shutter at a timing at which a person captured as a photographic subject smiles, for example. The auto shutter function may be realized by detecting the face of the person captured as the photographic subject, analyzing the detected face, and identifying whether the person smiles based on the analysis result. As long as the image capturing apparatus 10 is operated to automatically release the shutter when a predetermined composition is formed, the auto-shutter function is not limited to the smile shutter.

In the case of the mode in which the image capturing apparatus 10 is operated as a single body, the setting controller 117 may change the settings so that the setting of the magnification ratio (zooming) becomes a predetermined magnification ratio which is determined in advance. As a specific example, in the case of the mode in which the image capturing apparatus 10 is operated as a single body, the setting controller 117 may change the settings so that the setting of the magnification ratio becomes a predetermined magnification ratio on a wide-angle side (e.g., a maximum wide-angle). With such a configuration, even in a situation in which a user cannot check a through-the-lens image, it is possible to prevent an image in which a desired photographic subject is not included in a screen from being captured.

Further, the setting controller 117 may change functions allocated to the operation unit 18 provided in the image capturing apparatus 10 according to an operation mode of the image capturing apparatus 10. As a specific example, the setting controller 117 may change the settings so that, in one mode, "still image capturing instruction" is allocated to the operation unit 18 to which "moving image capturing instruction" is allocated in the other mode.

Further, as another example, the setting controller 117 may perform switching between validity and invalidity of the operation unit 18 provided in the image capturing apparatus 10 according to an operation mode of the image capturing apparatus 10. As a specific example, the setting controller 117 may validate at least a part of the operation unit 18 provided in the image capturing apparatus 10 only in the mode in which the image capturing apparatus 10 is operated as a single body, and may invalidate at least a part of the operation unit 18 in the mode in which the image capturing apparatus 10 and the information processing terminal 30 are capable of being operated in association.

In the case of the mode in which the image capturing apparatus 10 is operated as a single body, the setting controller 117 may operate the image capturing apparatus 10 so that predetermined information is notified of through the notification unit 19 provided in the image capturing apparatus 10. As a specific example, in the case of the mode in which the image capturing apparatus 10 is operated as a single body, the setting controller 117 may control various settings so that a level is displayed in the notification unit 19 configured as a liquid crystal panel, for example.

As another example, the notification unit 19 may be configured as a sound output device that notifies of predetermined information using an output of sound information, such as a speaker. In this case, for example, the notification unit 19 may output sound information when the image capturing apparatus 10 enters a predetermined state, to thereby notify a user of the sound information. As a specific example, the notification unit 19 may output sound information when the image capturing apparatus 10 enters a horizontal state, to thereby realize the same function as that of a level. Here, the setting controller 117 may change a setting relating to whether to validate the present function realized by the notification unit 19, according to the operation mode of the image capturing apparatus 10.

As described above, in the image capturing apparatus 10 according to the present embodiment, when a state in which the image capturing apparatus 10 is operated as a single body is detected, the image capturing apparatus 10 transitions to a predetermined operation mode, and a setting for controlling an operation of the imaging unit 15 by the process execution unit 111 is changed to a setting which is determined in advance for the operation mode. With such a configuration, the information processing system according to the present embodiment is capable of preventing an image which is not intended by a user, such as an image captured in a state in which a setting suitable for a photographic subject or a scene is not set, from being captured even in a situation in which it is difficult to set settings in imaging or to check an angle of view.

Hereinbefore, the exemplary functional configuration of the information processing system according to the present embodiment has been described with reference to FIG. 7.

3. PROCESS

Figure 8:
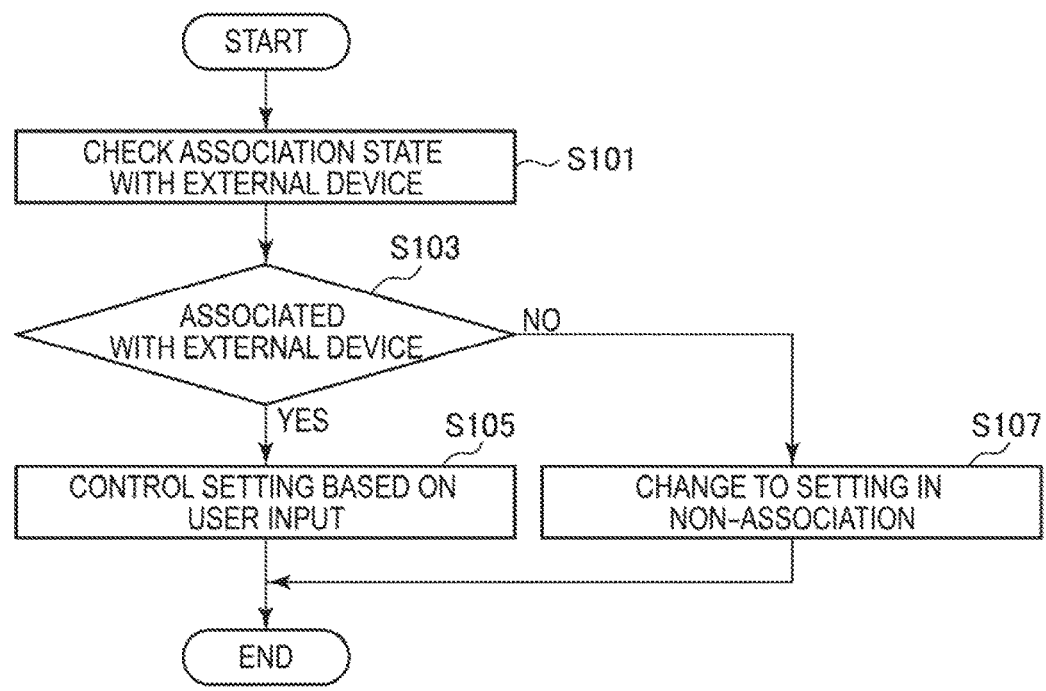
FIG. 8 is a flowchart illustrating an exemplary flow of a series of operations of the image capturing apparatus according to the present embodiment.

Next, an example of a flow of a series of operations of the image capturing apparatus 10 according to the present embodiment will be described particularly focusing on a mode changing operation of the image capturing apparatus 10 according to an association state thereof with the information processing terminal 30 which is an external apparatus. FIG. 8 is a flowchart illustrating an exemplary flow of a series of operations of the image capturing apparatus 10 according to the present embodiment.

(Step S101)

The state monitoring unit 113 monitors whether communication between the image capturing apparatus 10 and the information processing terminal 30 via the network n11 is in a valid state, and notifies the mode determination unit 115 of the monitoring result. Here, the state monitoring unit 113 may sequentially monitor (alive monitoring) the communication via the network n11, may detect communication cut-off when the communication via the network n11 is cut off, and may notify the mode determination unit 115 of the detected result. Further, when the communication via the network n11 is established, the state monitoring unit 113 may notify the mode determination unit 115 of the result.

The mode determination unit 115 determines a current operation mode of the image capturing apparatus 10 according to whether information transmission and reception is capable of being performed between the image capturing apparatus 10 and the information processing terminal 30 via the network n11 (in other words, whether the information processing terminal 30 is capable of detecting the state of the image capturing apparatus 10), based on the monitoring result notified from the state monitoring unit 113. A specific example of the operation mode includes a mode in which the image capturing apparatus 10 and the information processing terminal 30 are capable of being operated in association or a mode in which the image capturing apparatus 10 is operated as a single body.

(Step S105)

Here, the mode determination unit 115 recognizes that the network n11 between the image capturing apparatus 10 and the information processing terminal 30 is established based on the monitoring result notified of by the state monitoring unit 113. In this case, the mode determination unit 115 recognizes that an operation mode at a current point of time is a mode in which the image capturing apparatus 10 and the information processing terminal are capable of being operated in association (YES in step S103). Then, the mode determination unit 115 notifies the setting controller 117 of the recognized operation mode.

The setting controller 117 causes the above-described process execution unit 111 to change a setting for controlling an operation of the imaging unit 15 by the process execution unit 111 according to the operation mode of the image capturing apparatus 10 notified of by the mode determination unit 115. Specifically, when the operation mode of the image capturing apparatus 10 is the mode in which the image capturing apparatus 10 and the information processing terminal 30 are capable of being operated in association, the setting controller 117 controls various settings so that a setting based on an instruction given through the information processing terminal 30 from a user is reflected.

(Step S107)

Further, the mode determination unit 115 recognizes that the network n11 between the image capturing apparatus 10 and the information processing terminal 30 is cut off based on the monitoring result notified of by the state monitoring unit 113. In this case, the mode determination unit 115 recognizes that an operation mode at a current point of time is the mode in which the image capturing apparatus 10 is operated as a single body (NO in step S103). The mode determination unit 115 notifies the setting controller 117 of the recognized operation mode.

Here, when a state in which the network n11 between the image capturing apparatus 10 and the information processing terminal 30 is cut off continues for a predetermined period of time or longer, the mode determination unit 115 may recognize that the operation mode of the image capturing apparatus 10 transitions to the mode in which the image capturing apparatus 10 is operated as a single body.

When the operation mode of the image capturing apparatus 10 notified of by the mode determination unit 115 is the mode in which the image capturing apparatus 10 is operated as a single body, the setting controller 117 changes various settings so that an imaging condition such as exposure or white balance is automatically controlled or an angle of view is automatically corrected, for example.

With such a configuration, according to the information processing system according to the present embodiment, even in a situation in which it is difficult to set settings in imaging or to check an angle of view, it is possible to prevent an image which is not intended by a user, such as an image captured in a state in which settings suitable for a photographic subject or a scene are not set, from being captured.

Hereinbefore, with reference to FIG. 8, an example of a flow of a series of operations of the image capturing apparatus 10 according to the present embodiment has been described, particularly focusing on a mode changing operation of the image capturing apparatus 10 according to an association state thereof with the information processing terminal 30 which is an external apparatus.

4. MODIFICATION EXAMPLE 1: CONTROL EXAMPLE BASED ON CHANGE IN ENVIRONMENT IN WHICH IMAGE IS CAPTURED

In the above-described embodiment, when the image capturing apparatus 10 transitions to the mode in which the image capturing apparatus 10 is operated as a single body, the image capturing apparatus 10 changes the setting for controlling the operation of the imaging unit 15 to a setting in which an imaging condition is automatically controlled or an angle of view is automatically corrected.

On the other hand, when the mode in which the image capturing apparatus 10 and the information processing terminal 30 are capable of being operated in association transitions to the mode in which the image capturing apparatus 10 is operated as a single body, if an environment in which an image is captured does not significantly change, there are cases in which it is preferable to apply a setting based on a user input before mode transition. Thus, when transitioning to the mode in which the image capturing apparatus 10 is operated as a single body, the image capturing apparatus 10 directly or indirectly detects a change in environment in which an image is captured, and may change the setting for controlling the operation of the imaging unit 15 when the environment changes. Accordingly, as Modification Example 1, an example in which, when the image capturing apparatus 10 transitions to the mode in which the image capturing apparatus 10 is operated as a single body, the image capturing apparatus 10 controls the setting for controlling the operation of the imaging unit 15 according to a change in the environment in which an image is captured will be described hereinafter.

4.1. MODIFICATION EXAMPLE 1.1: CONTROL BASED ON TIME INFORMATION IN IMAGING

First, as Modification Example 1-1, an example in which the image capturing apparatus 10 controls the setting for controlling the operation of the imaging unit 15 based on time information in imaging will be described with reference to FIG. 9. FIG. 9 is a diagram illustrating an example of a control method according to Modification Example 1-1.

In the example illustrated in FIG. 9, as indicated by "current imaging," at a current point of time, the image capturing apparatus 10 is operated in the mode in which the image capturing apparatus 10 is operated as a single body. Further, in a state indicated by "previous imaging," in imaging immediately before the "current imaging," the image capturing apparatus 10 is operated in the mode in which the image capturing apparatus 10 and the information processing terminal 30 are operated in association. In this description, for ease of description, it is assumed that "previous imaging" represents latest imaging which is performed in the mode in which the image capturing apparatus 10 and the information processing terminal 30 are operated in association.

The image capturing apparatus 10 according to Modification Example 1-1 controls the setting for controlling the operation of the imaging unit 15 according to an elapsed time after the mode in which the image capturing apparatus 10 and the information processing terminal 30 are capable of being operated in association transitions to the mode in which the image capturing apparatus 10 is operated as a single body.

As a specific example, the image capturing apparatus 10 recognizes an imaging date and time of previous imaging using a history (a so-called time stamp) of time information when the image capturing apparatus 10 and the information processing terminal 30 are connected via the network n11.

Further, when an elapsed time from the recognized imaging date and time of the previous imaging exceeds a predetermined threshold value (time width) in the mode in which the image capturing apparatus 10 is operated as a single body, the image capturing apparatus 10 recognizes that an environment in which an image is captured changes. In other words, when the elapsed time from the recognized date and time of latest imaging exceeds the predetermined threshold value, the image capturing apparatus 10 changes the setting for controlling the operation of the imaging unit 15 to a setting which is determined in advance for the mode in which the image capturing apparatus 10 is operated as a single body.

For example, the predetermined threshold value may be set to "2 hours." In the example illustrated in FIG. 9, "6 hours" elapse from the previous imaging to the current imaging in the mode in which the image capturing apparatus 10 is operated as a single body. Thus, in the case of the example illustrated in FIG. 9, the image capturing apparatus 10 changes the setting for controlling the operation of the imaging unit 15 to a setting which is determined in advance for the mode in which the image capturing apparatus 10 is operated as a single body.

As long as the image capturing apparatus 10 is capable of recognizing imaging date and time of previous imaging (in other words, latest imaging which is performed in the mode in which the image capturing apparatus 10 and the information processing terminal 30 are operated in association), the method is not particularly limited. As a specific example, the image capturing apparatus 10 may recognize an imaging date and time of previous imaging based on a history of time information when the network n11 between the image capturing apparatus 10 and the information processing terminal 30 is cut off As another example, when the image capturing apparatus 10 and the information processing terminal 30 are configured to be capable of performing information transmission and reception via a network other than the network n11, the image capturing apparatus 10 may use a history of time information relating to connection or cut-off of the other network. As an example of the other network, a network of near field wireless communication based on a communication standard such as near field communication (NFC), a network based on the Bluetooth (registered trademark) standard, or the like may be used.

A threshold value for evaluating a difference between pieces of time information which is a reference for changing settings in the image capturing apparatus 10 may be appropriately set according to operations using the image capturing apparatus 10, such as a usage form of the image capturing apparatus 10 or a usage scene to be conceived.

When changing the setting for controlling the operation of the imaging unit 15, the image capturing apparatus 10 may recognize a time slot in imaging based on acquired time information, and may change details of the setting based on the recognized time slot. As a specific example, upon recognizing that the recognized time slot in imaging is in the evening based on the acquired time information, the image capturing apparatus 10 may change the setting for capturing an image according to the brightness of the evening.

Hereinbefore, an example in which the image capturing apparatus 10 changes the setting for controlling the operation of the imaging unit 15 based on the time information in imaging has been described with reference to FIG. 9.

4.2. MODIFICATION EXAMPLE 1-2: CONTROL BASED ON CHANGE IN IMAGING SCENE

Next, as Modification Example 1-2, an example in which the image capturing apparatus 10 changes the setting for controlling the imaging unit 15 based on a change in an imaging scene will be described with reference to FIG. 10. FIG. 10 is a diagram illustrating an example of a control method according to Modification Example 1-2.

For example, in the example illustrated in FIG. 10, as indicated by "current imaging," at a current point of time, the image capturing apparatus 10 is operated in a mode in which the image capturing apparatus 10 is operated as a single body. Further, as indicated by "previous imaging," in imaging immediately before the "current imaging," the image capturing apparatus 10 is operated in the mode in which the image capturing apparatus 10 and the information processing terminal 30 are operated in association. In this description, for ease of description, it is assumed that "previous imaging" represents latest imaging which is performed in the mode in which the image capturing apparatus 10 and the information processing terminal 30 are operated in association.

When operated in each operation mode, the image capturing apparatus 10 according to Modification Example 1-2 determines imaging scenes during the operation mode, and records the imaging scenes as a history.

The image capturing apparatus 10 compares feature values of respective imaging scenes between an imaging scene in current imaging and an imaging scene in previous imaging. When a difference between the feature values exceeds a threshold value, the image capturing apparatus 10 recognizes that an environment in which an image is captured changes. In other words, when the difference between the feature values of the imaging scenes in the current imaging and the previous imaging exceeds the threshold value, the image capturing apparatus 10 changes the setting for controlling the operation of the imaging unit 15 to a setting which is determined in advance for the mode in which the image capturing apparatus 10 is operated as a single body.

For example, in the example illustrated in FIG. 10, since the imaging scene in the current imaging shows "beach in the daytime" and the imaging scene in the previous imaging shows "night view," a feature of the imaging scene (e.g., brightness, contrast, or the like) significantly changes between the imaging scenes. Thus, in the case of the example illustrated in FIG. 10, the image capturing apparatus 10 changes the setting for controlling the operation of the imaging unit 15 to a setting which is determined in advance for the mode in which the image capturing apparatus 10 is operated as a single body.

As long as change of imaging scenes between current imaging and previous imaging can be quantitatively evaluated, the type of information to be used as feature values of the imaging scenes is not particularly limited. For example, the image capturing apparatus 10 may use data indicating a feature value of a captured image (or a through-the-lens image) as data indicating a feature value of an imaging scene. Specifically, the image capturing apparatus 10 may digitize brightness and contrast of a captured image, and may use the result as data indicating a feature value of an imaging scene.

As another example, the image capturing apparatus 10 may use a histogram of a captured image as data indicating a feature value of an imaging scene. In this case, the image capturing apparatus 10 is capable of recognizing a difference between imaging scenes based on a difference between deviations of the histograms.

The image capturing apparatus 10 may use an imaging condition such as exposure (in other words, an aperture or a shutter speed, white balance, or ISO, which is automatically calculated in imaging, as data indicating a feature value of an imaging scene. Specifically, when a captured scene is a dark scene such as a night view, for example, the image capturing apparatus 10 calculates a high sensitivity as the ISO and calculates a slow speed as the shutter speed. On the other hand, when the captured image is a bright scene such as a beach in the daytime, the image capturing apparatus 10 calculates a low sensitivity as the ISO and calculates a fast speed as the shutter speed. In this way, by comparing imaging conditions calculated in imaging, the image capturing apparatus 10 may recognize a difference between imaging scenes.

Further, the image capturing apparatus 10 may analyze captured images to extract photographic subjects captured in the images, and may recognize a difference between the imaging scenes based on a difference between the photographic subjects. As a specific example, the image capturing apparatus 10 may extract a person from images using a face recognition technique or the like, and may recognize a difference between imaging scenes according to whether the person is captured in the images.

A threshold value for evaluating a change of a feature value of an imaging scene, which is a reference for changing settings in the image capturing apparatus 10, may be appropriately set according to operations using the image capturing apparatus 10, such as a usage form of the image capturing apparatus 10 or a usage scene to be conceived.

Hereinbefore, as Modification Example 1-2, an example in which the image capturing apparatus 10 changes the setting for controlling the operation of the imaging unit 15 based on change in imaging scenes has been described with reference to FIG. 10.

4.3. MODIFICATION EXAMPLE 1-3: CONTROL BASED ON POSITION INFORMATION IN IMAGING

Figure 11:
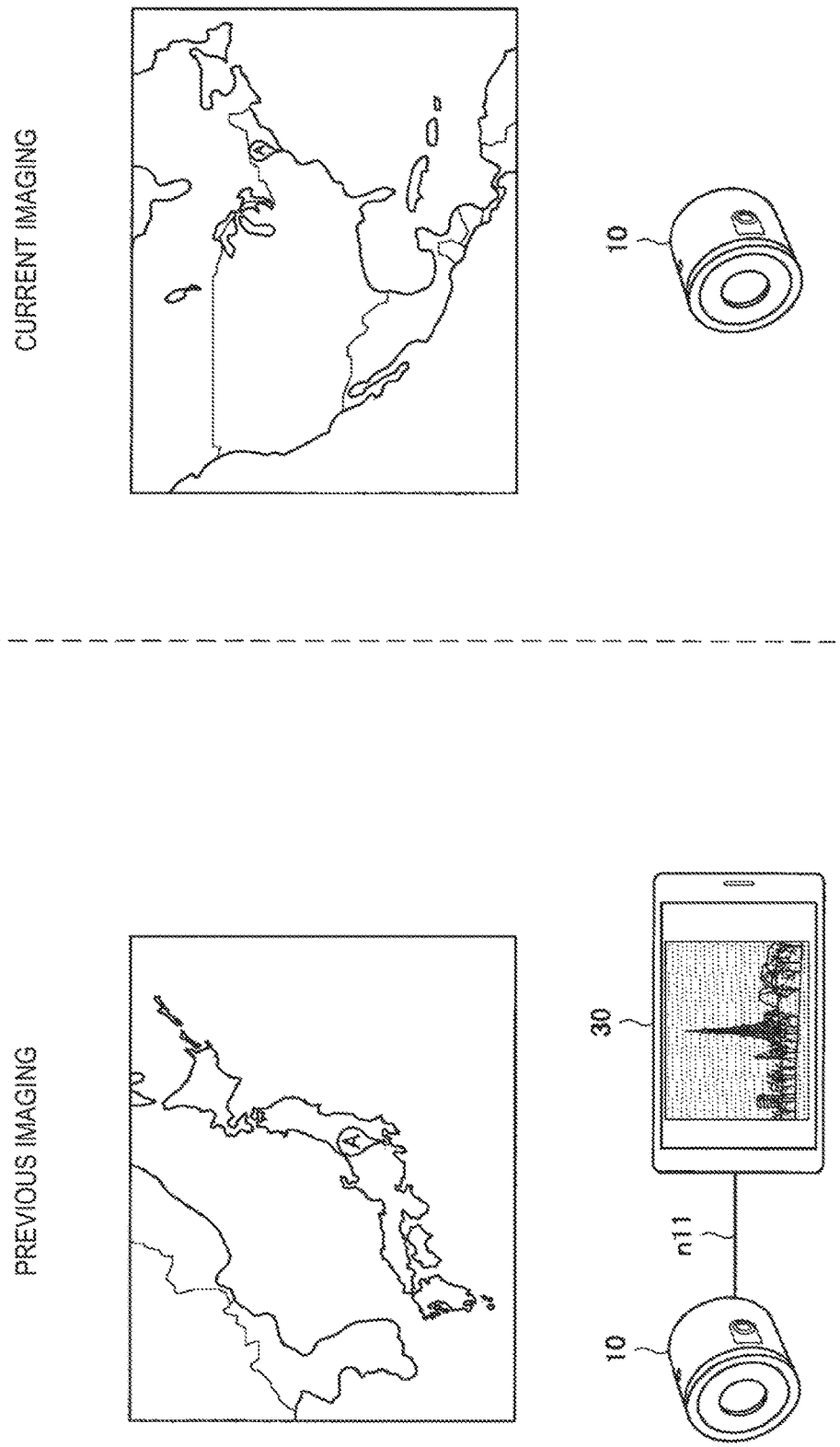
FIG. 11 is a diagram illustrating an example of a control method according to Modification Example 1-3.

Next, as Modification Example 1-3, an example in which the image capturing apparatus 10 changes the setting for controlling the operation of the imaging unit 15 based on position information in imaging will be described with reference to FIG. 11. FIG. 11 is a diagram illustrating an example of a control method according to Modification Example 1-3.

For example, in the example illustrated in FIG. 11, as indicated by "current imaging," at a current point of time, the image capturing apparatus 10 is operated in the mode in which the image capturing apparatus 10 is operated as a single body. Further, as indicated by "previous imaging," in imaging immediately before the "current imaging," the image capturing apparatus 10 is operated in the mode in which the image capturing apparatus 10 and the information processing terminal 30 are operated in association. In this description, for ease of description, it is assumed that "previous imaging" represents latest imaging which is performed in the mode in which the image capturing apparatus 10 and the information processing terminal 30 are operated in association.

The image capturing apparatus 10 according to Modification Example 1-3 records position information indicating the position of the image capturing apparatus 10 when operated in each operation mode as a history. The position information of the image capturing apparatus 10 may be acquired by a Global Positioning System (GPS) receiver provided in the image capturing apparatus 10, for example.

Further, the image capturing apparatus 10 compares position information acquired in current imaging with position information acquired in previous imaging. When a difference between the pieces of position information exceeds a threshold value, the image capturing apparatus 10 recognizes that an environment in which an image is captured changes. In other words, when the difference between the pieces of position information in the previous imaging and the current imaging exceeds the threshold value, the image capturing apparatus 10 changes the setting for controlling the operation of the imaging unit 15 to a setting which is determined in advance for the mode in which the image capturing apparatus 10 is operated as a single body.

For example, in the example illustrated in FIG. 11, since position information in current imaging shows "overseas" and position information in previous imaging shows "domestic," the position information significantly changes between the current imaging and the previous imaging.

Thus, in the case of the example illustrated in FIG. 11, the image capturing apparatus 10 changes the setting for controlling the operation of the imaging unit 15 to a setting which is determined in advance for the mode in which the image capturing apparatus 10 is operated as a single body.

A threshold value for evaluating a difference between pieces of position information, which is a reference for changing settings in the image capturing apparatus 10, may be appropriately set according to operations using the image capturing apparatus 10, such as a usage form of the image capturing apparatus 10 or a usage scene to be conceived.

Further, when changing the setting for controlling the operation of the imaging unit 15, the image capturing apparatus 10 may change details of the setting based on acquired position information. As a specific example, the image capturing apparatus 10 may acquire information about a photographic subject such as a structure (a so-called landmark) built at a position indicated by the position information based on the acquired position information, and may change the setting based on the information about the photographic subject. For example, when the image capturing apparatus 10 recognizes that the image capturing apparatus 10 is located in the vicinity of Tokyo Tower based on the acquired position information, the image capturing apparatus 10 may recognize Tokyo Tower as a photographic subject, and may recognize that Tokyo Tower is red based on the information about Tokyo Tower. Thus, the image capturing apparatus 10 may change a setting for capturing an image so that the red color of Tokyo Tower which is a photographic subject is well reflected.

Hereinbefore, as Modification Example 1-3, an example in which the image capturing apparatus 10 changes the setting for controlling the operation of the imaging unit 15 based on position information in imaging has been described with reference to FIG. 11.

4.4. CONCLUSION

Hereinbefore, as described as Modification Example 1, when transitioning to the mode in which the image capturing apparatus 10 is operated as a single body, the image capturing apparatus 10 may control a setting for controlling an operation of the imaging unit 15 according to change in an environment in which an image is captured. With such a configuration, if the environment in which the image is captured does not significantly change, the image capturing apparatus 10 is capable of applying a setting based on a user input before mode transition, in other words, a setting intended by a user in imaging.

Modification Example 1-1 to Modification Example 1-3 described above may be appropriately combined. As a specific example, the image capturing apparatus 10 recognizes that a time slot is night and the image capturing apparatus 10 is located in a city area, based on acquired time information and position information. In this case, the image capturing apparatus 10 may change a setting (for example, a setting for capturing an image) for controlling an operation of the imaging unit 15 so that a night view of the city is well reflected.

As another example, the image capturing apparatus 10 recognizes that a time slot is night and the image capturing apparatus 10 is located in the vicinity of Tokyo Tower, based on acquired time information and position information. In this case, the image capturing apparatus 10 may change a setting (for example, a setting for capturing an image) for controlling an operation of the imaging unit 15 so that Tokyo Tower at night is well reflected.

5. MODIFICATION EXAMPLE 2: EXAMPLE OF OPERATION WHEN IMAGE CAPTURING APPARATUS IS ASSOCIATED WITH INFORMATION PROCESSING TERMINAL

Next, as Modification Example 2, an example in which the image capturing apparatus 10 changes a setting for controlling an operation of the imaging unit 15 according to an association state between the image capturing apparatus 10 and the information processing terminal 30 in the mode in which the image capturing apparatus 10 and the information processing terminal 30 are operated in association will be described.

As illustrated in FIG. 3 and FIG. 4, in the mode in which the image capturing apparatus 10 and the information processing terminal 30 are operated in association, the image capturing apparatus 10 may be attached to the information processing terminal 30, or the image capturing apparatus 10 and the information processing terminal 30 may be separated from each other.

On the other hand, according to a holding state indicating whether one of the information processing terminal 30 and the image capturing apparatus 10 is held with respect to the other thereof (in other words, whether the image capturing apparatus 10 is attached to the information processing terminal 30), as illustrated in FIG. 3 and FIG. 4, a usage form of the information processing terminal 30 and the image capturing apparatus 10 may vary.

In consideration of such a situation, in an information processing system according to Modification Example 2, the image capturing apparatus 10 detects the holding state between the image capturing apparatus 10 and the information processing terminal 30, and changes a setting for controlling an operation of the imaging unit 15 according to the detected holding state. With such a configuration, in the information processing system according to Modification Example 2, it is possible to automatically change a setting (for example, imaging conditions) for controlling an operation of the imaging unit 15 according to a usage form based on the holding state between the image capturing apparatus 10 and the information processing terminal 30. Hereinafter, the information processing system according to Modification Example 2 will be described in more detail with reference to FIG. 12 and FIG. 13.

First, an example of a holding state in the information processing system according to Modification Example 2 will be described with reference to FIG. 12. FIG. 12 is a diagram illustrating an overview of the information processing system according to Modification Example 2, which shows an example of a holding state in the information processing system.

As illustrated in FIG. 12, the image capturing apparatus 10 and the information processing terminal 30 may be operated in association either in a state in which the image capturing apparatus 10 is attached to the information processing terminal 30 or in a state in which the information processing terminal 30 and the image capturing apparatus 10 are separated from each other. In this description, as illustrated in FIG. 12, the state in which the image capturing apparatus 10 is attached to the information processing terminal 30 may be referred to as a "fixed state," and the state in which the information processing terminal 30 and the image capturing apparatus 10 are separated from each other may be referred to as a "separated state."

Figure 13:
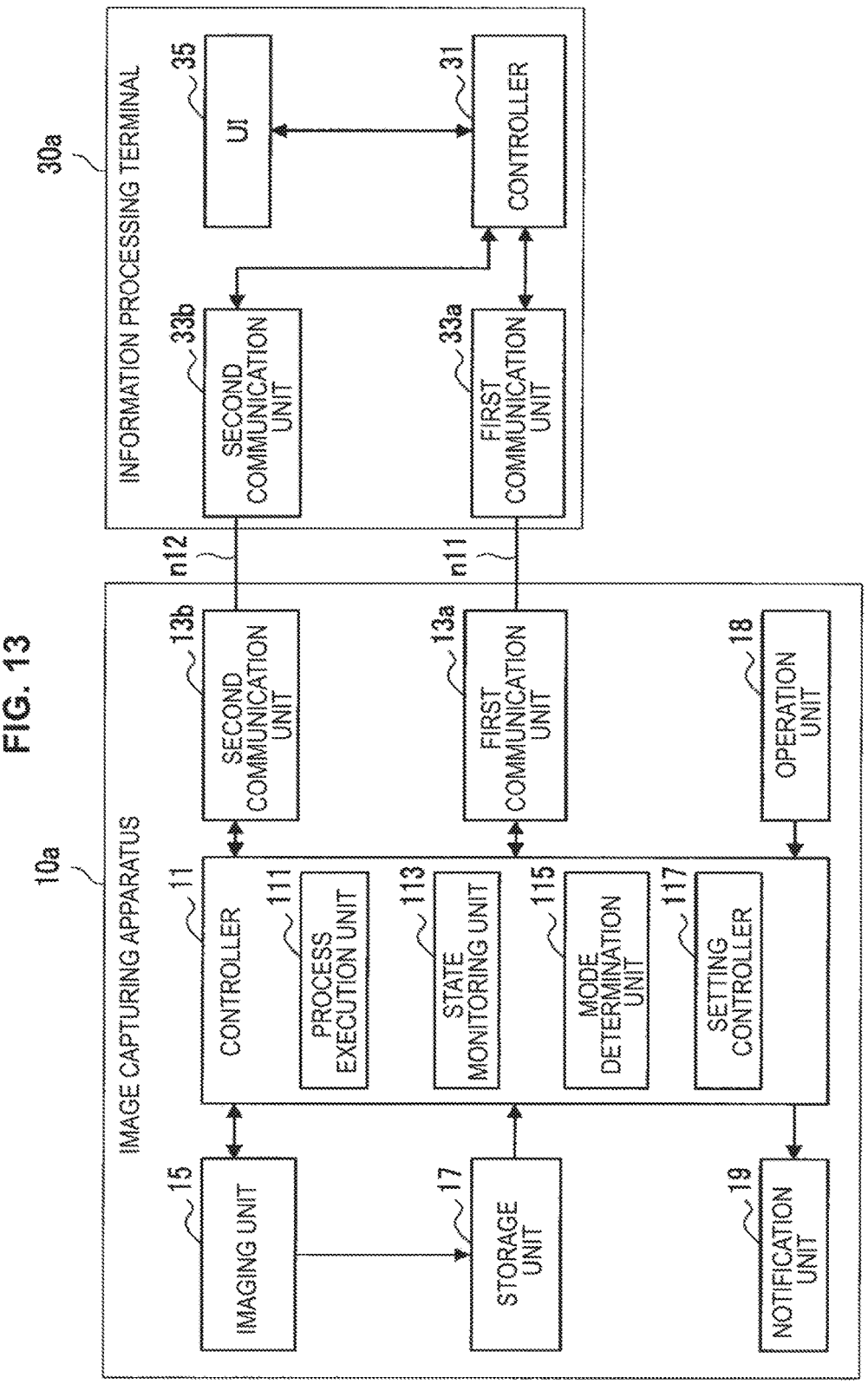
FIG. 13 is a block diagram illustrating an exemplary functional configuration of the information processing system according to Modification Example 2.

Next, an example of a functional configuration of the information processing system according to Modification Example 2 will be described with reference to FIG. 13. FIG. 13 is a block diagram illustrating an exemplary functional configuration of the information processing system according to Modification Example 2. This description will focus on parts different from the information processing system (see FIG. 7) according to the above-described embodiment, and detailed description of configurations that are the same as those of the information processing system according to the embodiment will not be repeated. Hereinafter, when the image capturing apparatus 10 according to Modification Example 2 is distinguished from the image capturing apparatus 10 according to the above-described embodiment, the image capturing apparatus 10 may be called an "image capturing apparatus 10a." Similarly, when the information processing terminal 30 according to Modification Example 2 is distinguished from the information processing terminal 30 according to the above-described embodiment, the information processing terminal 30 according to Modification Example 2 may be called an "information processing terminal 30a."

As illustrated in FIG. 13, the image capturing apparatus 10a is different from the image capturing apparatus 10 (see FIG. 7) according to the above-described embodiment in that a second communication unit 13b is provided therein. A first communication unit 13a corresponds to the communication unit 13 of the image capturing apparatus 10 according to the above-described embodiment. Similarly, the information processing terminal 30a according to the present embodiment is different from the information processing terminal 30 (see FIG. 7) according to the above-described embodiment in that a second communication unit 33b is provided therein. The first communication unit 33a corresponds to the communication unit 33 of the information processing terminal 30 according to the above-described embodiment.

The second communication unit 13b is a communication interface that allows each component in the image capturing apparatus 10a to communicate with the information processing terminal 30a via a network n12 different from the network n11. A specific example of the network n12 includes a network of near field wireless communication based on a communication standard such as an NFC. Hereinafter, when each component of the image capturing apparatus 10a performs data transmission and reception with the information processing terminal 30a via the network n12, the data transmission and reception is assumed to be performed through the second communication unit 13b even unless otherwise described.

The second communication unit 33b is a communication interface that allows each component in the information processing terminal 30a to communicate with the image capturing apparatus 10 via the wireless network n12 described above. In a case where each component of the information processing terminal 30a performs data transmission and reception with the image capturing apparatus 10a via the network n12, the data transmission and reception is assumed to be performed through the second communication unit 33b unless otherwise described.

In the fixed state illustrated in FIG. 12, since the image capturing apparatus 10a and the information processing terminal 30a are close to each other, it is possible to establish the network n12 between the image capturing apparatus 10a and the information processing terminal 30a. In other words, in the fixed state, the image capturing apparatus 10a is in a state in which it is capable of communicating with the information processing terminal 30a via the network n12, in addition to the network n11.

On the other hand, in the separated state illustrated in FIG. 12, since the image capturing apparatus 10a and the information processing terminal 30a are separated from each other, it is difficult to establish the network n12 between the image capturing apparatus 10a and the information processing terminal 30a. Thus, in the separated state, the image capturing apparatus 10a is in a state in which it is difficult to perform communication with the information processing terminal 30a via the network n12.

In other words, the image capturing apparatus 10a and the information processing terminal 30a execute a predetermined sequence via the network n12, thereby recognizing whether the holding state between the information processing terminal 30a and the image capturing apparatus 10a is the fixed state or the separated state.

Using such a configuration, the image capturing apparatus 10a according to Modification Example 2 determines whether the holding state between the image capturing apparatus 10a and the information processing terminal 30a is the fixed state or the separated state, and changes a setting for controlling an operation of the imaging unit 15 according to the determination result. Hereinafter, details of the control will be described particularly focusing on operations of the state monitoring unit 113, the mode determination unit 115, and the setting controller 117.

The state monitoring unit 113 according to Modification Example 2 monitors whether communication via the network n12 is in a valid state, in addition to monitoring of communication via the network n11, and notifies the mode determination unit 115 of the monitoring result of each state of the networks n11 and n12. Here, the state monitoring unit 113 may sequentially monitor (alive monitoring) the communications via the networks n11 and n12, may detect communication cut-off when any one or both of the communications via the networks n11 and n12 are cut off, and may notify the mode determination unit 115 of the result. When the communications via the networks n11 and n12 are established, the state monitoring unit 113 may notify the mode determination unit 115 of the result.

The mode determination unit 115 determines a current operation mode of the image capturing apparatus 10a according to whether information transmission and reception between the image capturing apparatus 10a and the information processing terminal 30a is capable of being performed via the network n11, based on the monitoring result of the state of the network n11 that is notified of. The operation is the same as that of the above-described embodiment.

The mode determination unit 115 determines whether the holding state between the image capturing apparatus 10a and the information processing terminal 30a is the fixed state or the separated state, based on the monitoring result of the state of the network n12 that is notified of. Specifically, when the network n12 is established, the mode determination unit 115 recognizes that the holding state between the image capturing apparatus 10a and the information processing terminal 30a is the fixed state. Further, when the network n12 is cut off, the mode determination unit 115 determines whether the holding state between the image capturing apparatus 10a and the information processing terminal 30a is the separated state.

The mode determination unit 115 notifies the setting controller 117 of the operation mode and the holding state recognized based on the monitoring result notified of by the state monitoring unit 113.

The setting controller 117 according to Modification Example 2 changes a setting for controlling an operation of the imaging unit 15 by the process execution unit 111 according to the operation mode of the image capturing apparatus 10a notified of by the mode determination unit 115 and the holding state between the image capturing apparatus 10a and the information processing terminal 30a.

For example, when the operation mode of the image capturing apparatus 10a is the mode in which the image capturing apparatus 10a is operated as a single body, the setting controller 117 changes the setting for controlling the operation of the imaging unit 15 to a setting which is determined in advance for the mode in which the image capturing apparatus 10a is operated as a single body. In the case of the mode in which the image capturing apparatus 10a is operated as a single body, the setting controller 117 changes various settings so that an imaging condition such as exposure or white balance is automatically controlled or an angle of view is automatically corrected. The operation is the same as that of the setting controller 117 according to the above-described embodiment.

On the other hand, when the operation mode of the image capturing apparatus 10a is the mode in which the image capturing apparatus 10a and the information processing terminal 30a are capable of being operated in association, the setting controller 117 changes the setting for controlling the operation of the imaging unit 15 according to the holding state between the image capturing apparatus 10a and the information processing terminal 30a.

For example, when the holding state between the image capturing apparatus 10a and the information processing terminal 30a is the fixed state, the setting controller 117 controls various settings so that a setting based on an instruction given through the information processing terminal 30 from a user is reflected.

On the other hand, when the holding state between the image capturing apparatus 10a and the information processing terminal 30a is the separated state, the setting controller 117 changes at least a part of settings to a setting which is determined in advance used for the separated state.

For example, in the case of the separated state, the setting controller 117 may validate an information notification function of the notification unit 19 which is provided in the image capturing apparatus 10a. As a specific example, the setting controller 117 may control various settings so that a level is displayed in the notification unit 19 configured as a liquid crystal panel. As another example, when the image capturing apparatus 10 is in a predetermined state (e.g., the image capturing apparatus 10 enter a horizontal state), the setting controller 117 may allow the notification unit 19 configured as a sound output device to output sound information.

In the case of the separated state, the setting controller 117 changes the settings so that an angle of view is automatically corrected. As a specific example, in the case of the separated state, the setting controller 117 may perform image processing so that an angle of view of a captured image becomes horizontal, to thereby change the setting to a setting for correcting the image.

In the case of the separated state, the setting controller 117 may set a correction amount due to image stabilization to be larger than that in the case of the fixed state.

As another example, the setting controller 117 may change the setting so that a function for automatically changing a display direction of a live view displayed on the information processing terminal 30*a* (e.g., a longitudinal screen and a transverse screen) is invalidated in the case of the separated state. In this case, the setting controller 117 may perform control so that the setting in the fixed state immediately before transitioning to the separated state is validated.

Further, when dropping of the image capturing apparatus 10 is detected, the setting controller 117 may perform switching between validation and invalidation of a dropping detection function for accommodating a lens of the imaging unit 15 to prevent damage to the lens. As a specific example, the setting controller 117 may change the setting so that the dropping detection function is validated in the case of the separated state.

The setting controller 117 may change a changing speed of a magnification ratio (zooming) according to the fixed state or the separated state. Further, as another example, in the case of the separated state, the setting controller 117 may change the setting so that a setting of a magnification ratio (zooming) becomes a predetermined magnification ratio which is determined in advance.

The setting controller 117 may change functions allocated to the operation unit 18 provided in the image capturing apparatus 10 according to a holding state between the image capturing apparatus 10*a* and the information processing terminal 30*a*. As a specific example, the setting controller 117 may change the setting so that, in one of the fixed state and the separated state, "still image capturing instruction" is allocated to the operation unit 18 to which "moving image capturing instruction" is allocated in the other mode.

As another example, the setting controller 117 may perform switching between validity and invalidity of the operation unit 18 provided in the image capturing apparatus 10 according to the holding state between the image capturing apparatus 10*a* and the information processing terminal 30*a*. As a specific example, the setting controller 117 may validate at least a part of the operation unit 18 provided in the image capturing apparatus 10 only in the separated state, and may invalidate at least a part of the operation unit 18 in the fixed state.

Hereinbefore, as described in Modification example 2, even in a state in which the image capturing apparatus 10*a* and the information processing terminal 30*a* are capable of being operated in association, the image capturing apparatus 10*a* may change various settings according to the holding state between the image capturing apparatus 10*a* and the information processing terminal 30*a*. With such a configuration, as illustrated in FIG. 3 and FIG. 4, it is possible to detect a holding state between the image capturing apparatus 10*a* and the information processing terminal 30*a*, and to change various settings in the image capturing apparatus 10*a* according to a usage form based on the holding state.

In the above-described example, an example in which the image capturing apparatus 10*a* recognizes a holding state between the image capturing apparatus 10*a* and the information processing terminal 30*a* according to a state of communication via the network n12 is shown, but the method is not limited to the above-described example as long as the holding state can be recognized. A specific example may include a configuration in which a sensor or a switch is provided in any one or both of the image capturing apparatus 10*a* and the information processing terminal 30*a*, and the holding state between the image capturing apparatus 10*a* and the information processing terminal 30*a* is recognized based on the sensor or the switch.

6. HARDWARE CONFIGURATION

Figure 14:
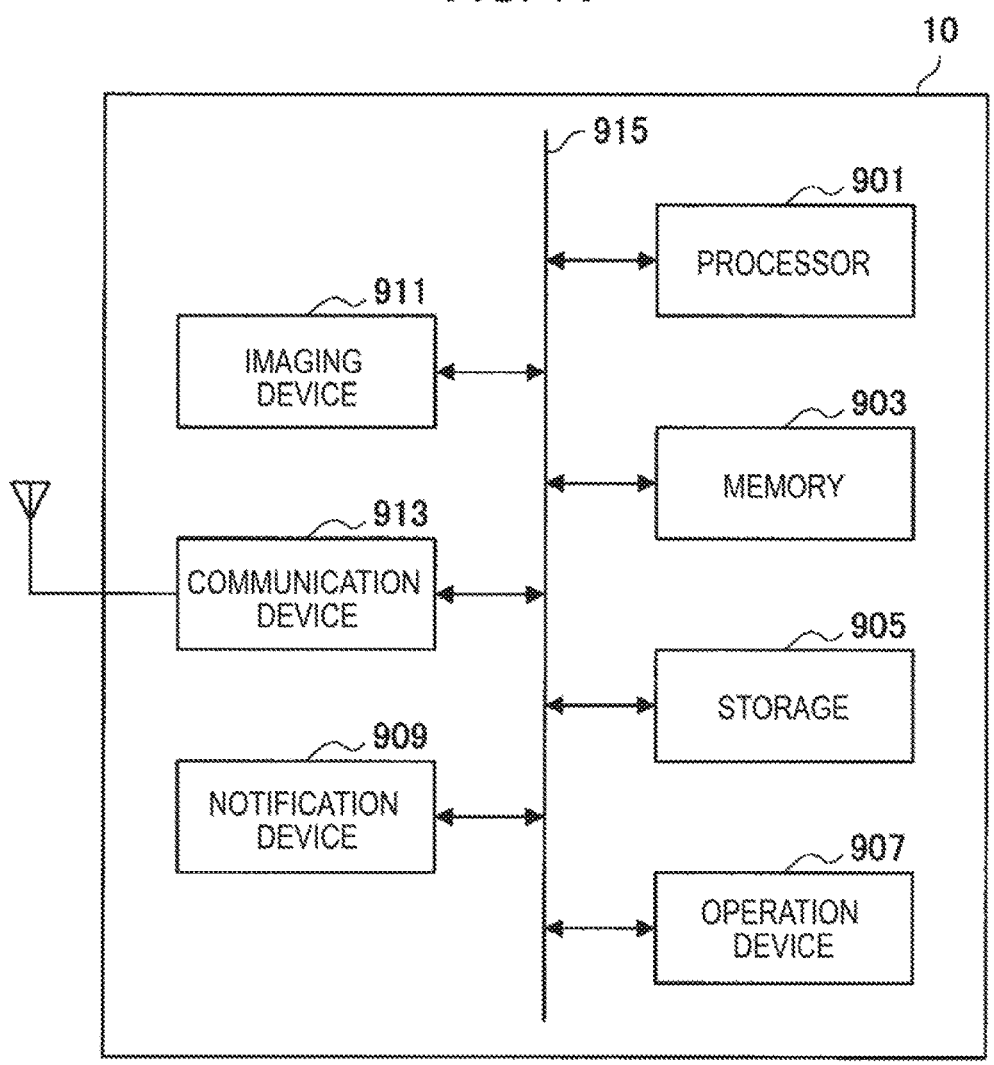
FIG. 14 is a diagram illustrating an exemplary hardware configuration of an image capturing apparatus according to the present embodiment.

An exemplary hardware configuration of the image capturing apparatus 10 according to an embodiment of the present disclosure will be described with reference to FIG. 14. FIG. 14 is a diagram illustrating an exemplary hardware configuration of the image capturing apparatus 10 according to an embodiment of the present disclosure.

As illustrated in FIG. 14, the image capturing apparatus 10 according to the present embodiment is configured to include a processor 901, a memory 903, a storage 905, an imaging device 911, a communication device 913, and a bus 915. The image capturing apparatus 10 may be configured to further include an operation device 907 and a notification device 909.

The processor 901 may be a central processing unit (CPU), a graphics processing unit (GPU), a digital signal processor (DSP), or a system on chip (SoC), as one example, and executes various types of processes for the image capturing apparatus 10. The processor 901 may be configured by an electronic circuit for executing various types of arithmetic and logical processes, as one example. Each configuration of the controller 11 described above may be realized by the processor 901.

An example of the memory 903 includes a random-access memory (RAM) and a read-only memory (ROM), and the memory 903 stores data and a program to be executed by the processor 901. The storage 905 may include a storage medium such as a semiconductor memory or a hard disk. As one example, the storage unit 17 described above may be at least one of the memory 903 and the storage 905, or may be configured by a combination of the both.

The operation device 907 has a function of generating an input signal used to perform an operation intended by a user. The operation device 907 may be configured to include an input unit, such as a button or a switch, used to allow the user to enter information and an input control circuit used to generate an input signal based on a user's input and supply the input signal to the processor 901, and the like, as one example. For example, the operation unit 18 described above may be configured by the operation device 907.

The notification device 909 is an example of an output device, and may be a device such as a liquid crystal display (LCD) device or an organic light emitting diode (OLED) device, as one example. In this case, the notification device 909 may notify a user of predetermined information by displaying a screen.

As another example, the notification device 909 may be a device for notifying a user of predetermined information using a pattern of lighting or blinking, such as a light emitting diode (LED). The notification device 909 may be a device, such as a speaker, for notifying a user of predetermined information by outputting an acoustic signal. The notification unit 19 described above may be realized by the notification device 909.

The imaging device 911 has a function of capturing a still image or a moving image through a lens under the control of the processor 901. The imaging device 911 may store the captured image in the memory 903 or the storage 905. The imaging unit 15 described above may be realized by the imaging device 911.

The communication device 913 is communication means provided in the image capturing apparatus 10 and communicates with an external apparatus via a network. The communication device 913 is a wired or wireless communication interface. When the communication device 913 is used as a wireless communication interface, the communication device 913 may be configured to include a communication antenna, a radio frequency (RF) circuit, a baseband processor, and the like.

The communication device 913 has a function of performing a variety of signal processing with respect to a signal received from an external apparatus, and is capable of supplying a digital signal generated from an analog signal to the processor 901. The communication unit 13 and the communication unit 33 may be configured by the communication device 913.

The bus 915 connects the processor 901, the memory 903, the storage 905, the operation device 907, the notification device 909, the imaging device 911, and the communication device 913 to each other. The bus 915 may be configured to include plural types of buses.

A program that allows hardware including a processor, a memory, and a storage incorporated in a computer to provide a function equivalent to the configuration of the image capturing apparatus 10 described above may be created. A computer readable recording medium on which the program is recorded may also be provided.

7. CONCLUSION

As described above, in the image capturing apparatus 10 according to the present embodiment, when a state in which the image capturing apparatus 10 is operated as a single body is detected, the image capturing apparatus 10 transitions to a predetermined operation mode, and changes a setting for controlling an operation of the imaging unit 15 by the process execution unit 111 to a setting which is determined in advance for the operation mode. With such a configuration, the information processing system according to the present embodiment is capable of preventing an image which is not intended by a user, such as an image captured in a state in which a setting suitable for a photographic subject or a scene is not set, from being captured even in a situation in which it is difficult to set settings in imaging or to check an angle of view.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, in addition to or in place of the above effects, the technique according to the present disclosure may achieve other effects that are obvious to those skilled in the art based on the description of this specification.

Additionally, the present technology may also be configured as below.

(1)

An information processing apparatus including:

a determination unit configured to determine whether a mode in which an external apparatus is capable of detecting a state of an imaging unit is set according to a communication state through a wireless communication channel between the information processing apparatus and the external apparatus; and a controller configured to control an operation of the imaging unit based on a result of the determination.

(2)

The information processing apparatus according to (1), wherein the controller controls the operation of the imaging unit based on different settings in a first mode which is the mode in which the external apparatus is capable of detecting the state of the imaging unit and a second mode which is different from the first mode.

(3)

The information processing apparatus according to (2), wherein the second mode is a mode to be transitioned in a state in which the communication between the information processing apparatus and the external apparatus is cut off (4)

The information processing apparatus according to (2) or (3), wherein the controller changes the setting according to an elapsed time after the first mode transitions to the second mode.

(5)

The information processing apparatus according to any one of (2) to (4), wherein the controller changes the setting based on an imaging scene in the second mode and an imaging scene in the first mode before being changed to the second mode.

(6)

The information processing apparatus according to any one of (2) to (5), wherein the controller changes the setting based on position information acquired in the second mode and position information acquired in the first mode before being changed to the second mode.

(7)

The information processing apparatus according to any one of (2) to (6), wherein the setting corresponding to the second mode includes a setting for automatically controlling at least a part of imaging conditions for image capturing in the imaging unit.

(8)

The information processing apparatus according to any one of (2) to (7), wherein the setting corresponding to the second mode includes a setting for performing predetermined image processing with respect to an image captured by the imaging unit.

(9)

The information processing apparatus according to any one of (2) to (8), wherein the controller notifies a notification unit provided in a same casing as a casing in which the imaging unit is provided of notification information indicating the state of the imaging unit in the second mode.

(10)

The information processing apparatus according to any one of (2) to (9), wherein the controller changes functions allocated to an operation unit provided in a same casing as a casing in which the imaging unit is provided according to which one of the first mode and the second mode is set.

(11)

The information processing apparatus according to any one of (2) to (10), wherein the determination unit determines a holding state indicating whether one of the imaging unit and the external apparatus is directly or indirectly held with respect to the other, and the controller controls the operation of the imaging unit based on different settings according to the determined holding state in the first mode.

(12)

The information processing apparatus according to (11), wherein the controller controls an operation relating to image capturing in the imaging unit based on different imaging conditions according to the determined holding state in the first mode.

(13)

The information processing apparatus according to (11) or (12), wherein the controller notifies the external apparatus of the notification information indicating the state of the imaging unit in a state in which the first mode is set and one of the imaging unit and the external apparatus is not held with respect to the other.

(14)

The information processing apparatus according to any one of (11) to (13), wherein the setting corresponding to the state in which the first mode is set and one of the imaging unit and the external apparatus is not held with respect to the other includes a setting for performing predetermined image processing with respect to an image captured by the imaging unit.

(15)

The information processing apparatus according to any one of (11) to (14), wherein the controller changes functions allocated to an operation unit provided in a same casing as a casing in which the imaging unit is provided according to the determined holding state in the first mode.

(16)

The information processing apparatus according to any one of (2) to (15), wherein the second mode is a mode in which the controller controls an operation relating to image capturing in the imaging unit based on, out of an instruction from an operation unit provided in a same casing as a casing in which the imaging unit is provided and an instruction from the external apparatus, only the instruction from the operation unit.

(17)

The information processing apparatus according to (16), further including:

a casing that includes the determination unit, the controller, the imaging unit, and the operation unit, wherein the casing does not include a display unit for displaying an image captured by the imaging unit, and the image captured by the imaging unit is displayed on a display unit provided in the external apparatus.

(18)

The information processing apparatus according to any one of (1) to (16), further including:

the imaging unit.

(19)

An information processing method including:

determining whether a mode in which an external apparatus is capable of detecting a state of an imaging unit is set according to a communication state through a wireless communication channel between the information processing apparatus and the external apparatus; and controlling, by a processor, an operation of the imaging unit based on a result of the determination.

(20)

A program that causes a computer to execute:

determining whether a mode in which an external apparatus is capable of detecting a state of an imaging unit is set according to a communication state through a wireless communication channel between the information processing apparatus and the external apparatus; and controlling an operation of the imaging unit based on a result of the determination.

REFERENCE SIGNS LIST 10, 10a image capturing apparatus
11 controller
111 process execution unit
113 state monitoring unit
115 mode determination unit
117 setting controller
13 communication unit
13a first communication unit
13b second communication unit
15 imaging unit
17 storage unit
18 operation unit
19 notification unit
30, 30a information processing terminal
31 controller
33 communication unit
33a first communication unit
33b second communication unit
35 UI

The invention claimed is:

1. An information processing apparatus, comprising:
a casing that includes an image sensor, a controller, and a communication interface, wherein:
the image sensor is configured to capture an image;
the communication interface is configured to communicate with an external apparatus; and
the controller is configured to:
communicate, to the external apparatus, an operational state of the image sensor in a first mode,
control imaging settings, to capture the image in the first mode, based on the communicated operational state,
update, in the first mode, setting values of the image sensor based on a user input received from the external apparatus, and
control the imaging settings, to capture the image in a second mode, based on single body image capturing settings,
wherein the single body image capturing settings, corresponding to the second mode, include at least one setting to capture the image in automatic imaging conditions, and
wherein the second mode is different from the first mode.

2. The information processing apparatus according to claim 1, wherein the communication between the communication interface and the external apparatus is cut off in the second mode.

3. The information processing apparatus according to claim 1, wherein the controller is further configured to control the imaging settings based on an elapsed time after transition from the first mode to the second mode.

4. The information processing apparatus according to claim 1, wherein the controller is further configured to control the imaging settings based on a first imaging scene in the second mode, and a second imaging scene in the first mode.

5. The information processing apparatus according to claim 1, wherein the controller is further configured to:
control the imaging settings based on first position information of the information processing apparatus in the second mode, and second position information of the information processing apparatus in the first mode, and
detect the second position information of the information processing apparatus before transition from the first mode to the second mode.

6. The information processing apparatus according to claim 1, further comprising input circuitry configured to receive the user input,
wherein the input circuitry is included in the casing, and
wherein the controller is further configured to change functions allocated to the input circuitry based on one of the first mode or the second mode.

7. The information processing apparatus according to claim 1, further comprising circuitry configured to detect a holding state in which the casing is attached to the external apparatus, and
wherein the controller is further configured to control operation of the image sensor based on the holding state in the first mode.

8. The information processing apparatus according to claim 7, wherein the controller is further configured to control the imaging settings based on the holding state in the first mode.

9. The information processing apparatus according to claim 7,
wherein the circuitry is further configured to detect a separated state in which the casing is detached from the external apparatus,
wherein the communication interface is further configured to communicate, to the external apparatus, a notification based on the separated state in the first mode, and
wherein the notification indicates a state of the image sensor.

10. The information processing apparatus according to claim 7,
wherein the circuitry is further configured to detect a separated state in which the casing is detached from the external apparatus, and
wherein the controller is further configured to correct the imaging settings based on the separated state in the first mode.

11. The information processing apparatus according to claim 7, further comprising input circuitry configured to receive the user input,
wherein the input circuitry is included in the casing, and
wherein the controller is further configured to change functions allocated to the input circuitry based on the detected holding state.

12. An information processing method, comprising:
communicating, by a processor, to an external apparatus, an operational state of an image sensor in a first mode;
controlling, by the processor, imaging settings to capture an image in the first mode based on the communicated operational state;
updating, in the first mode, setting values of an image sensor based on a user input received from the external apparatus; and
controlling, by the processor, the imaging settings to capture the image in second mode based on a single body image capturing settings,
wherein the single body image capturing settings, corresponding to the second mode, include at least one setting to capture the image in automatic imaging conditions, and
wherein the second mode is different from the first mode.

13. A non-transitory computer-readable medium having stored thereon computer-executable instructions that, when executed by a processor, cause the processor to execute operations, the operations comprising:
communicating, to an external apparatus, an operational state of an image sensor in a first mode;
controlling, imaging settings to capture an image in the first mode, based on the communicated operational state;
updating, in the first mode, setting values of an image sensor based on user input received from the external apparatus; and
controlling, the imaging settings to capture an image in a second mode, based on single body image capturing settings,
wherein the single body image capturing settings, corresponding to the second mode, include at least one setting to capture the image in automatic imaging conditions, and
wherein the second mode is different from the first mode.

* * * * *